United States Patent
Kanzaki et al.

(10) Patent No.: US 6,259,984 B1
(45) Date of Patent: Jul. 10, 2001

(54) AUTOMATIC TRANSMISSION CONTROL WITH OBJECT-ORIENTED PROGRAM

(75) Inventors: Yasuhiro Kanzaki, Anjo; Akira Oda, Nagoya, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/562,973

(22) Filed: May 3, 2000

(30) Foreign Application Priority Data

| May 11, 1999 | (JP) | ................................................. 11-129980 |
| Nov. 11, 1999 | (JP) | ................................................. 11-321033 |
| Feb. 23, 2000 | (JP) | ................................................. 12-045905 |

(51) Int. Cl.[7] ................................................. F16H 59/36
(52) U.S. Cl. ............................... 701/51; 701/52; 701/53; 701/54; 701/61; 701/62; 701/64; 477/901; 477/905; 477/906
(58) Field of Search ..................... 701/51, 52, 53, 701/55, 61, 62, 64; 477/901, 905, 904, 906; 74/336 R, 335

(56) References Cited

U.S. PATENT DOCUMENTS

| 5,393,278 | 2/1995 | Kyushima et al. | .................. 477/120 |
| 5,618,243 | * 4/1997 | Kondo et al. | .......................... 477/119 |
| 5,873,281 | * 2/1999 | Stasik et al. | ............................ 74/335 |
| 5,957,990 | * 9/1999 | Graf et al. | .............................. 701/57 |

FOREIGN PATENT DOCUMENTS

| 0 892 342 A2 | 1/1999 | (EP) . |
| 5-10438 | 1/1993 | (JP) . |
| 7-139410 | 5/1995 | (JP) . |
| 8-244499 | 9/1996 | (JP) . |
| 2-2616023 | 3/1997 | (JP) . |
| 9-151755 | 6/1997 | (JP) . |
| 11-303982 | 11/1999 | (JP) . |

* cited by examiner

*Primary Examiner*—William A. Cuchlinski, Jr.
*Assistant Examiner*—Marthe Marc-Coleman
(74) *Attorney, Agent, or Firm*—Nixon & Vanderhye P.C.

(57) ABSTRACT

An electronic control system for an automatic transmission has an electronic control unit including a CPU and a memory. The control program is programmed based on an object-oriented programming. An object such as a domain control unit or individual control parts are provided for driving a corresponding linear solenoid valve. A shift request output unit determines types of required shift and outputs a shift request message including the shift type. The domain control unit determines a method to be executed in response to the shift type ID. Preferably, the shift request output unit further determines whether the shift is a single shift or a multiple shift and whether the shift is a normal shift or a special shift. These determination results are also included in the shift request message, so that the domain control unit varies the method to control the linear solenoid valves. The control program can be revised in a simple manner by revising only the domain control unit and individual control parts corresponding to the linear solenoid valve having the changed specification.

30 Claims, 26 Drawing Sheets

|  | C₀ | C₁ | C₂ | B₀ | B₁ | B₂ | B₃ | B₄ | F₀ | F₁ | F₂ |
|---|---|---|---|---|---|---|---|---|---|---|---|
| N | ○ | | | | | | | | | | |
| Rev | | | ○ | ○ | | | | ○ | | | |
| 1st | ○ | ○ | | | | | | ● | ○ | | ○ |
| 2nd | ● | ○ | | | | | ○ | | ○ | | |
| 3rd | ○ | ○ | | | ● | ○ | | | ○ | ○ | |
| 4th | ○ | ○ | ○ | | | △ | | | ○ | | |
| 5th | | ○ | ○ | ○ | | △ | | | | | |

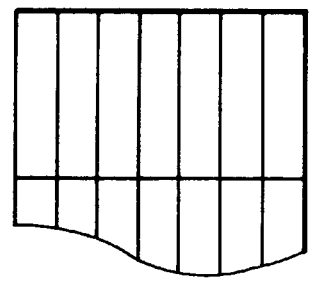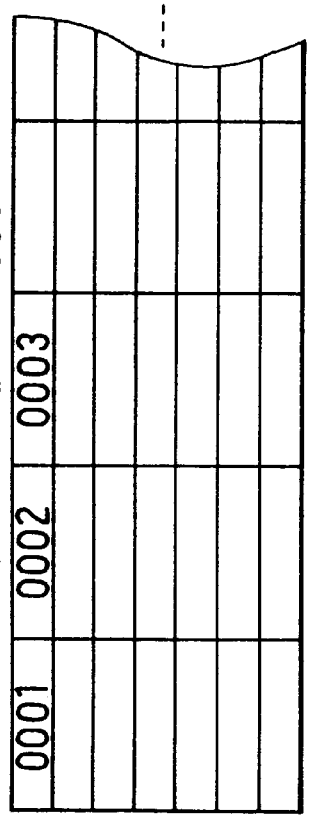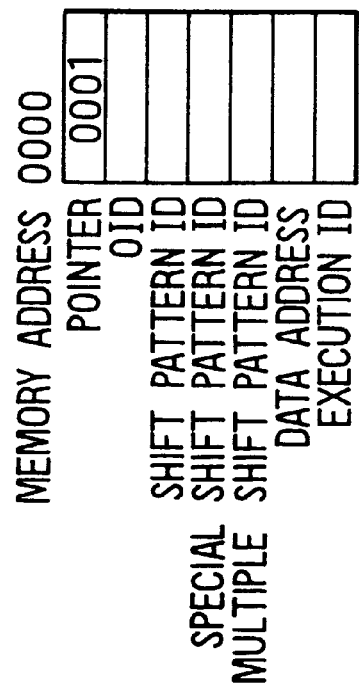
FIG. 32A
FIG. 32B

FIG. 34A

PRIORITY#1

| ID | OUTPUT DATA AREA |
|---|---|
| a | 20% |
| b | FF |
| c | FF |
| ⋮ | ⋮ |

FIG. 34B

PRIORITY#2

| ID | OUTPUT DATA AREA |
|---|---|
| d | 10% |
| e | FF |
| f | FF |
| ⋮ | ⋮ |

FIG. 34C

PRIORITY#3

| ID | OUTPUT DATA AREA |
|---|---|
| ⋮ | FF |
| ⋮ | FF |
| ⋮ | FF |
| ⋮ | ⋮ |

AUTOMATIC TRANSMISSION CONTROL WITH OBJECT-ORIENTED PROGRAM

CROSS REFERENCE TO RELATED APPLICATION

This application relates to and incorporates herein by reference Japanese Patent Applications No. 11-129980 filed May 11, 1999, No. 11-321033 filed Nov. 11, 1999 and No. 2000-45905 filed Feb. 23, 2000.

BACKGROUND OF THE INVENTION

1. Field of the Invention

This invention relates to an electronic control for vehicle automatic transmissions, and particularly to an electronic control which controls automatic transmissions based on an object-oriented program.

2. Related Art

Various electronic controls for automatic transmissions are proposed in, for instance, JP 2616023, JPA-8-244499 and JP-A-11-303982. Each electronic control unit has a control program which is defined by dividing control contents into each shift type. However, because the program is divided into each shift type, the common control contents are included in a plurality of shift types. Thus, a memory resource that stores the whole program becomes unnecessarily large and the program development takes a long time unnecessarily. For example, programs corresponding to respective different shift types redundantly include the same control algorithms for driving same solenoid valve.

SUMMARY OF THE INVENTION

It is therefore an object of the present invention to provide an electronic transmission control which simplifies programming of a control program and enables revision of the control program without requiring a too much development work.

According to the present invention, a control program is defined as an object-oriented program. The object-oriented program means the program involving the concept, that the work is processed with attention to an operation target (or control target) as a person do so usually, that is modeled into a computer system. The object-oriented program is comprised of objects. The object is a program module that collectively includes the data and procedure (that is, method) for processing the data.

In the object-oriented programming, the function of a control program is divided into predetermined divided functions of drive parts that are control targets. An object is prepared for each function. Objects are combined with each other by means of communication between objects. Thus, operation of the object actually means the operation that is performed by a programmed computer according to the object. That is, the computer executes a sequence of processes according to the method of the object.

In one aspect of the present invention, a shift type of an automatic transmission is determined first, and a drive control request message including the determined shift type is transmitted. The content of a drive control process to be performed is determined for each drive parts based on the received shift type.

In another aspect of the present invention, it is further determined whether the shift control is being performed currently upon establishing the shift determination, and the shifting stage of the current shift control is determined. A shifting stage information is included in the drive control request message as a part thereof so that the content of the drive control process is determined based on the shift type and shifting stage.

In a further aspect of the present invention, it is determined whether a shift control is to be performed or not is determined depending on a normal shift condition and a special shift condition. The special shift condition is determined as shifting based on other than engine conditions (vehicle speed and throttle angle), but based on signals generated during manual shift control, cruise control and the like. The special shift condition information is included in a drive control request message as a part thereof so that the content of the drive control process is determined based on the shift type and the special shift condition.

BRIEF DESCRIPTION OF THE DRAWINGS

Other objects, features and advantages of the present invention will become more apparent from the following detailed description made with reference to the accompanying drawings. In the drawings:

FIGS. 32A and 32B are tables showing memory areas for storing a drive control request message and a drive start request message in the third embodiment;

FIGS. 34A–34C are tables showing control value buffers of an output regulation unit object in the third embodiment;

DETAILED DESCRIPTION OF THE PREFERRED EMBODIMENT

Figure 1:
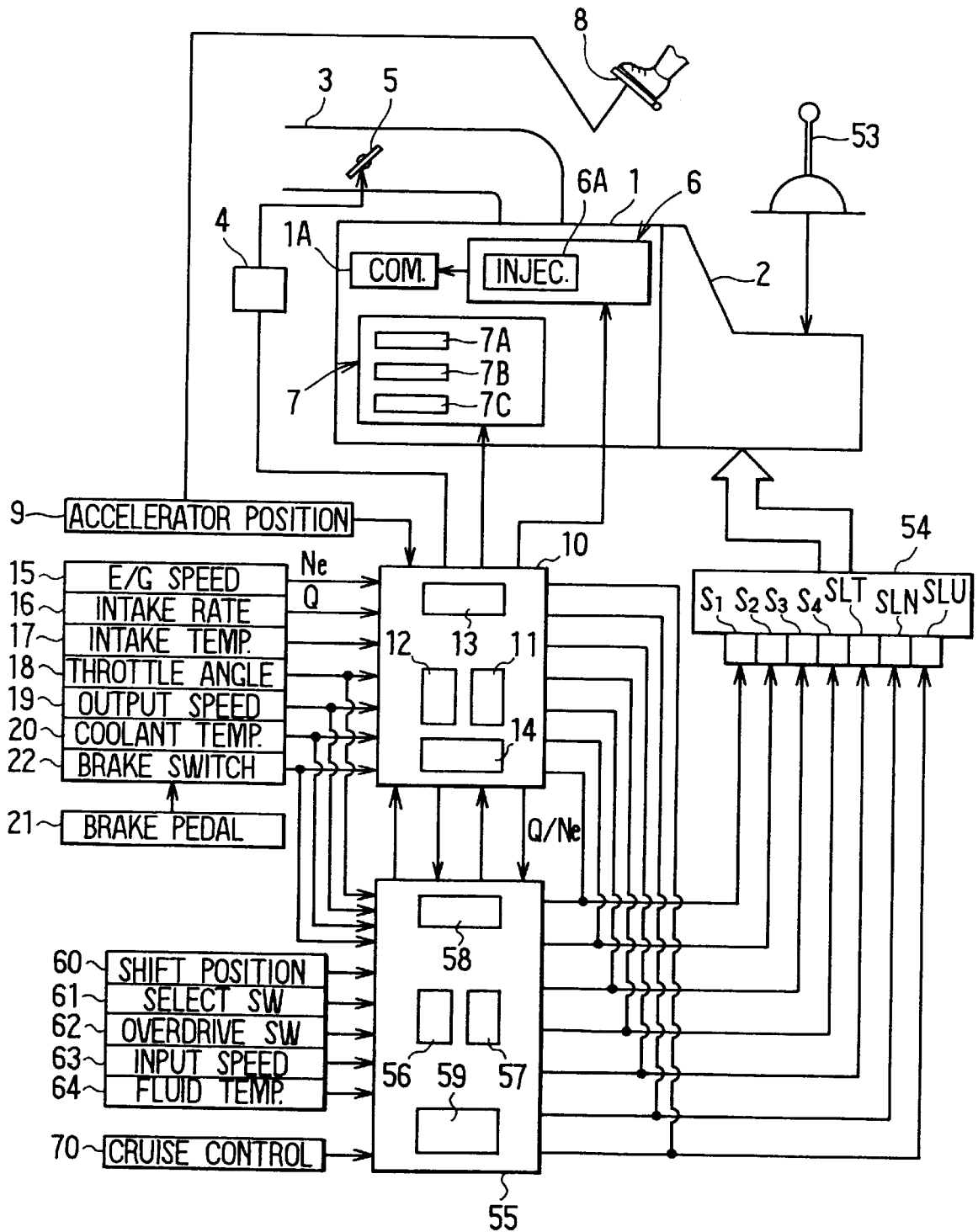
FIG. 1 is a schematic diagram showing an electronic automatic transmission control system mounted on a vehicle according to a first embodiment of the present invention.

An electronic automatic transmission control according to the present invention will be described in detail hereinafter with reference various embodiments shown in the drawings. In the following embodiments, object-oriented programming is particularly applied to reduce shift shocks in gear-shifting transition of the automatic transmission.

(First Embodiment)

Referring first to FIG. 1 showing an electronic control system for automatic transmissions of a vehicle, an engine 1 is shown as connected to an automatic transmission 2. The engine 1 is constructed so that the power is controlled electrically, and an intake pipe 3 of the engine 1 is provided with an electronic throttle valve 5 that is driven by means of a servomotor 4. The engine 1 is provided with a fuel injection control unit 6 including an injector 6A of a combustion chamber 1A for controlling the fuel injection rate and an ignition time control unit 7 including a spark plug 7A, a distributor 7B, and an ignition coil 7C.

The depression of a depression of an accelerator pedal 8, that is, accelerator position, which represents the output request to the engine 1, is detected by an accelerator pedal sensor 9, and the detection signal is supplied to an engine electronic control unit (E-ECU) 10. The E-ECU 10 comprises a microcomputer mainly provided with a central processing unit (CPU) 11, a memory unit (RAM and ROM) 12, an input interface 13, and an output interface 14.

The E-ECU 10 receives the signal supplied from an engine speed sensor 15 for detecting the engine (E/G) speed Ne, the signal supplied from an intake air rate sensor 16 for detecting the intake air rate Q, the signal supplied from an intake air temperature sensor 17 for detecting the intake air temperature, and the signal supplied from a throttle sensor 18 for detecting the opening angle of the electronic throttle valve 5.

Furthermore, the E-ECU 10 receives the signal supplied from an output rotation speed sensor 19 for detecting the rotation speed (output rotation speed) of the automatic transmission 2, the signal supplied from an engine coolant temperature sensor 20 for detecting the engine coolant temperature, and the signal supplied from a brake switch 22 for detecting the depression of a brake pedal 21. The vehicle speed is calculated based on the signal supplied from the output rotation speed sensor 19.

The E-ECU 10 performs arithmetic process of data detected by various sensors and switches to determine the running state of the vehicle, and controls the opening angle of the electronic throttle valve 5, the fuel injection rate of the fuel injection control unit 6, and the ignition timing of the ignition time control unit 7.

Figures 2, 3:
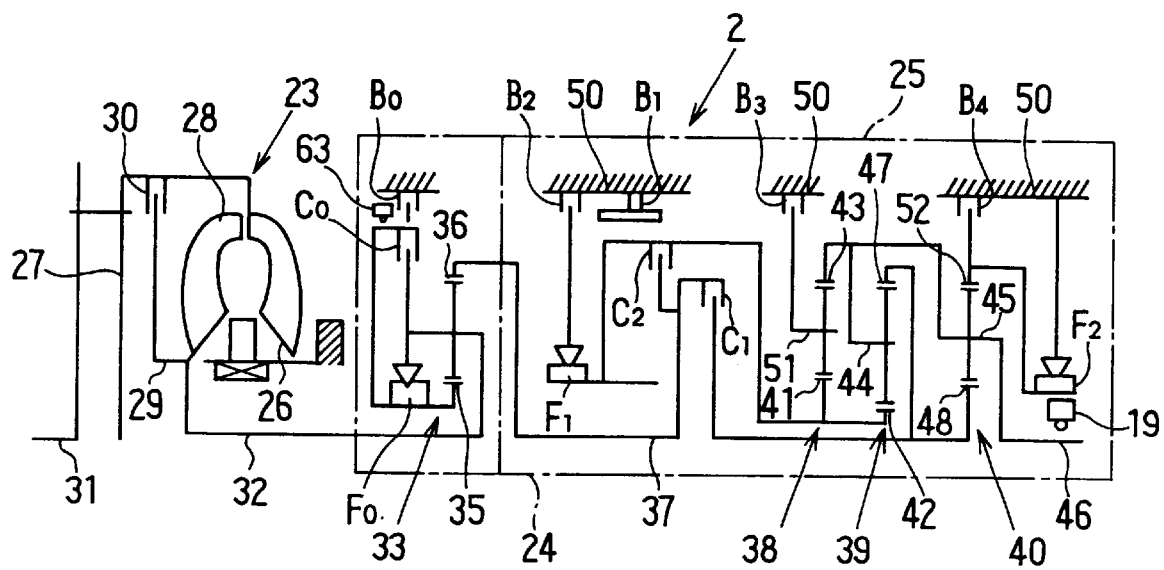
FIG. 2 is a schematic diagram showing an exemplary gear train of an automatic transmission.
FIG. 3 is a table showing engaged/disengaged states of a frictional engaging unit for setting shift positions of the automatic transmission.

The automatic transmission 2 is constructed as shown in FIG. 2. The automatic transmission 2 is of the type which sets gear-shift positions including five forward shift positions and one reverse shift position. The automatic transmission 2 is provided with a torque converter 23, a sub transmission 24, and a main transmission 25. The torque converter 23 is provided with a front cover 27 combined with a pump impeller 26 and a member combined with a turbine runner 28, that is, a hub 29 and a lock-up clutch 30.

The front cover 27 is connected to a crankshaft 31 of the engine 1, and the input shaft 32 connected to the turbine runner 28 is connected to a carrier 24 of an over-driving planetary gear mechanism 33 that constitutes the sub transmission 24.

A multiple disk clutch C0 and a one-way clutch F0 are provided between the carrier 34 that constitutes the planetary gear mechanism 33 and a sun gear 35. The one-way clutch F0 is provided so as to engage when the sun gear 35 is rotated in the positive direction with respect to the carrier 34, that is, in the same rotation direction as that of the input shaft 32. A ring gear 36 that is an output component of the sub transmission 24 is connected to an intermediate shaft 37 that operates as the input component of the main transmission 25. A multiple disk brake B0 for braking the rotation of the sun gear 35 selectively is provided.

Accordingly, in the state that the multiple disk clutch C0 or the one-way clutch F0 is engaged with the sub transmission 24, because the whole planetary gear mechanism 33 is rotated together, the intermediate shaft 37 rotates in the same rotation speed as that of the input shaft 32, and the shift position is low. On the other hand, in the state that the brake BQ is engaged to stop the rotation of the sun gear 35, the ring gear 36 is rotated at a higher speed in the positive direction with respect to the input shaft, and the shift position is high.

The main transmission 25 is provided with three groups of planetary gear mechanisms 38, 39 and 40. These rotational components are connected as described hereunder. A sun gear 41 of the first planetary gear mechanism 38 and a sun gear 42 of the second planetary gear mechanism 39 are connected with each other. A ring gear 43 of the first planetary gear mechanism 38, a carrier 44 of the second planetary gear mechanism 39, and a carrier 45 of the third planetary gear mechanism 40 are connected together, and an output shaft 46 is connected to the carrier 45. Furthermore, a ring gear 47 of the second planetary gear mechanism 39 is connected to a sun gear 48 of the third planetary gear mechanism 40.

A gear train of the main transmission 25 operates to set five shift positions including forward shift positions and reverse shift position, and clutches and brakes used for shifting the position are provided as described hereunder. A first clutch C1 is provided between the ring gear 47 and sun gear 48 connected with each other and the intermediate shaft 37. A second clutch C2 is provided between the sun gear 41 of the first planetary gear mechanism 38 and the sun gear 42 of the second planetary gear mechanism 39 connected with each other and the intermediate shaft 37.

A first brake B1, which is a hand brake, is provided so as to brake the rotation of the respective sun gears 41 and 42 of the first planetary gear mechanism 38 and the second planetary gear mechanism 39. A one-way clutch F1 and a second brake B2, which is a multiple disk brake, are disposed in series between the sun gears 41 and 42 and a casing 50. The first one-way clutch F1 is constructed so as to engage with the sun gears 41 and 42 when the sun gears 41 and 42 are rotated in the reverse direction with respect to the rotation direction of the input shaft 32.

A third brake B3, which is a multiple disk brake, is provided between a carrier 51 of the first planetary gear mechanism 38 and the casing 50. A fourth brake B4, which is a multiple disk brake, and a second one-way clutch F2 are provided as a brake for braking the rotation of a ring gear 52 of the third planetary gear mechanism 40. The fourth brake B4 and the second one-way clutch F2 are disposed in parallel to each other between the casing 50 and the ring gear 52. The second one-way clutch F2 is constructed so as to engage with the ring gear when the ring gear 52 is rotated in the reverse direction.

The automatic transmission 2 constructed as above engages/disengages clutches and brakes as shown in FIG. 3 to thereby set any one shift position selectively from among five forward shift positions and one reverse shift position. In FIG. 3, ○ denotes engaged state, ● denotes engaged state when engine brake is activated, Δ denotes both engaged/disengaged states, and the blank denotes disengaged state. In this example, by shifting manually the shift lever 53, P (parking) range, R (reverse) range, N (neutral) range, D (drive) range, 4 range, 3 range, 2 range, and L range can be set. The shift position is changed in the operational range corresponding to the set range.

A hydraulic control unit 54 shown in FIG. 1 controls setting or switching of the shift position in the automatic transmission 2, controls engaging/disengaging and slipping operation of the lock-up clutch 30, controls the line pressure of a hydraulic circuit of the hydraulic control unit 54, and controls the engaging pressure of the frictional engaging units (clutches C0 to C2, and brakes B0 to B4). The hydraulic control unit 54 is controlled electrically, and provided with first to third shift solenoid valves S1 to S3 for operating to change the shift position of the automatic transmission 2, and a fourth solenoid valve S4 operating for controlling the engine brake state.

Furthermore, the hydraulic control unit 54 is provided with a linear solenoid valve SLT for controlling the line pressure of the hydraulic circuit, a linear solenoid valve SLN for controlling the accumulator back pressure during shifting transition of the automatic transmission 2, and a linear solenoid valve SLU for controlling the engaging pressure of the lock-up clutch 30 and predetermined frictional engaging units, and connected to a transmission electronic control unit (T-ECU) 55. The T-ECU 55 is comprised of a microcomputer including a central processing unit (CPU) 56, a memory unit (RAM and ROM) 57, an input interface 58, and an output interface 59.

The T-ECU 55 receives, for controlling the automatic transmission 2, the signal supplied from the throttle sensor 18, the signal supplied from the output rotation speed sensor 19, the signal supplied from the engine coolant temperature sensor 20, and the signal supplied from the brake switch 22. The T-ECU 55 also receives the signal supplied from a shift position sensor 60 for detecting manual operation of the shift lever 53, the signal supplied from a pattern select switch 61 operating for changing or correcting the position shifting diagram that is used for controlling the automatic transmission 2, the signal supplied from an overdrive switch 62, the signal supplied from an input rotation speed sensor 63 for detecting the rotation speed of the multiple disk clutch C0 (input rotation speed), and the signal supplied from a fluid temperature sensor 64 for detecting working fluid temperature of the automatic transmission 2. The T-ECU 55 also receives the signal of a cruise control unit 70.

The T-ECU 55 and the E-ECU 10 are connected with each other so as to communicate the data. The E-ECU 10 transmits the signal such as intake air quantity (Q/Ne) per one rotation to the T-ECU 55, and the T-ECU 55 transmits the signal equivalent to the command signal to the solenoid valves and the signal for indicating the shift position to the E-ECU 10.

The memory unit 57 of the T-ECU 55 is provided with a stored position shifting diagram (shift map) used for controlling the shift position of the automatic transmission 2. In the position shifting diagram, the position shifting point for shifting from one shift position to another shift position is set with the parameter of running state of a vehicle, for example, accelerator position and vehicle speed. The T-ECU 55 determines whether the shift position is changed or not based on the accelerator position and the vehicle speed with reference to the position shifting diagram. If the T-ECU 55 determines the shift position to be changed, then the T-ECU 55 supplies the control signal to the solenoid valve of the hydraulic control unit 54 to thereby operate engaging/disengaging of a predetermined frictional engaging unit.

Furthermore, the T-ECU 55 is provided with a stored lock-up clutch control map for controlling the operation of the lock-up clutch 30. In the lock-up clutch map, the area for engaging/disengaging or the area for slip controlling the lock-up clutch 30 is set with the parameter of the accelerator position and the vehicle speed. In addition, the T-ECU 55 is provided with a fail-safe function in which the T-ECU 55 determines the failure of various solenoid valves and controls the state of the structural components so as not to cause malfunction in the vehicle operation based on the determination result.

During the shifting transition, the variation of engaging pressure of a frictional engaging unit, that is, the variation of torque capacity and the inertia force variation of a rotating member can cause the abrupt variation of the output torque of the automatic transmission 2. This variation of the torque is perceived as the shift shock. To mitigate the shift shock during the shifting transition of the automatic transmission 2, various controls are performed. Such controls include the control for reducing the torque of the engine 1, the control of the line pressure of hydraulic circuit of the hydraulic control unit 54, the control of engaging pressure of the frictional engaging unit, and the control of the lock-up clutch 30. These controls are described briefly hereunder.

The E-ECU 10 controls the fuel injection rate and ignition timing, and the opening angle of the electronic throttle valve 5 based on the input signal and data. During the shifting transition of the automatic transmission 2, at least any one of the control for delaying the ignition timing of the ignition time control unit 7, the control for reducing the fuel injection rate by the fuel injection control unit 6, and the control for throttling the opening angle of the electronic throttle valve 5 is performed to thereby temporarily reduce the output torque of the engine 1.

Furthermore, as shown in FIG. 3, it is required to bring the third brake B2 into engaged state in order to set the shift position to "2nd", and the engaging pressure of the third brake B3 is controlled by the linear solenoid valve SLU. The linear solenoid valve SLU is provided with a function to generate the fluid pressure that is proportional to the current usually, and during the shifting transition, the duty ratio of the linear solenoid valve SLU is controlled to thereby regulate the engaging pressure of the third brake B3.

The line pressure of the hydraulic circuit of the hydraulic control unit 54 is controlled by the linear solenoid valve SLT. The linear solenoid valve SLT is provided with a function to generate the fluid pressure that is proportional to the current usually. During the shifting transition, the duty ratio of the linear solenoid valve SLT is controlled to thereby regulate the line pressure.

Furthermore, the engaging pressure of the frictional engaging unit that constitutes the shift position of the automatic transmission 2 is controlled by the accumulator back pressure, and the accumulator back pressure is controlled by the linear solenoid valve SLN. The linear solenoid valve SLN is provided with a function to generate the fluid pressure that is proportional to the current usually, and during the shifting transition, the duty ratio of the linear solenoid valve SLN is controlled to regulate the engaging pressure of the frictional engaging unit.

Shift position change performed while the lock-up clutch 30 is being engaged can cause increased shift shock because the torque converter 23 does not function to absorb the torque variation. To avoid the increased shift shock, the lock-up clutch 30 is temporarily disengaged during position shift of the automatic transmission 2 to thereby mitigate the torque variation transmitted from the front cover 27 to the input shaft 32.

Various controls for mitigating the shift shock of the automatic transmission 2 are performed during the shifting process (change process of shift position) of the automatic transmission 2. Therefore, the T-ECU 55 is provided with a function to determine the stage in the shifting process (progress of shifting) based on the input rotation speed, output rotation speed, and shift position of the automatic transmission 2.

These various controls for mitigating the shift shock are the same or are different in the control content (for example, the magnitude (high or low) of the fluid pressure and the engaging pressure of the frictional engaging unit, and the magnitude (high or low) of the engaging pressure of the lock-up clutch 30) for each shift type. In some cases, the starting time is the same as the ending time of the control for each shift type. In other cases, at least one of the starting time and ending time of the control is different for each shift type. Some controls are performed limitedly only to shift operation of specified shift type, some controls are not performed limitedly only to shift operation of specified shift type. Controls that are performed for mitigating the shift shock (for example, control of fluid pressure and engaging pressure of the frictional engaging unit, and control of engaging pressure of the lock-up clutch 30) are selectively different for each shift type.

Figure 4:
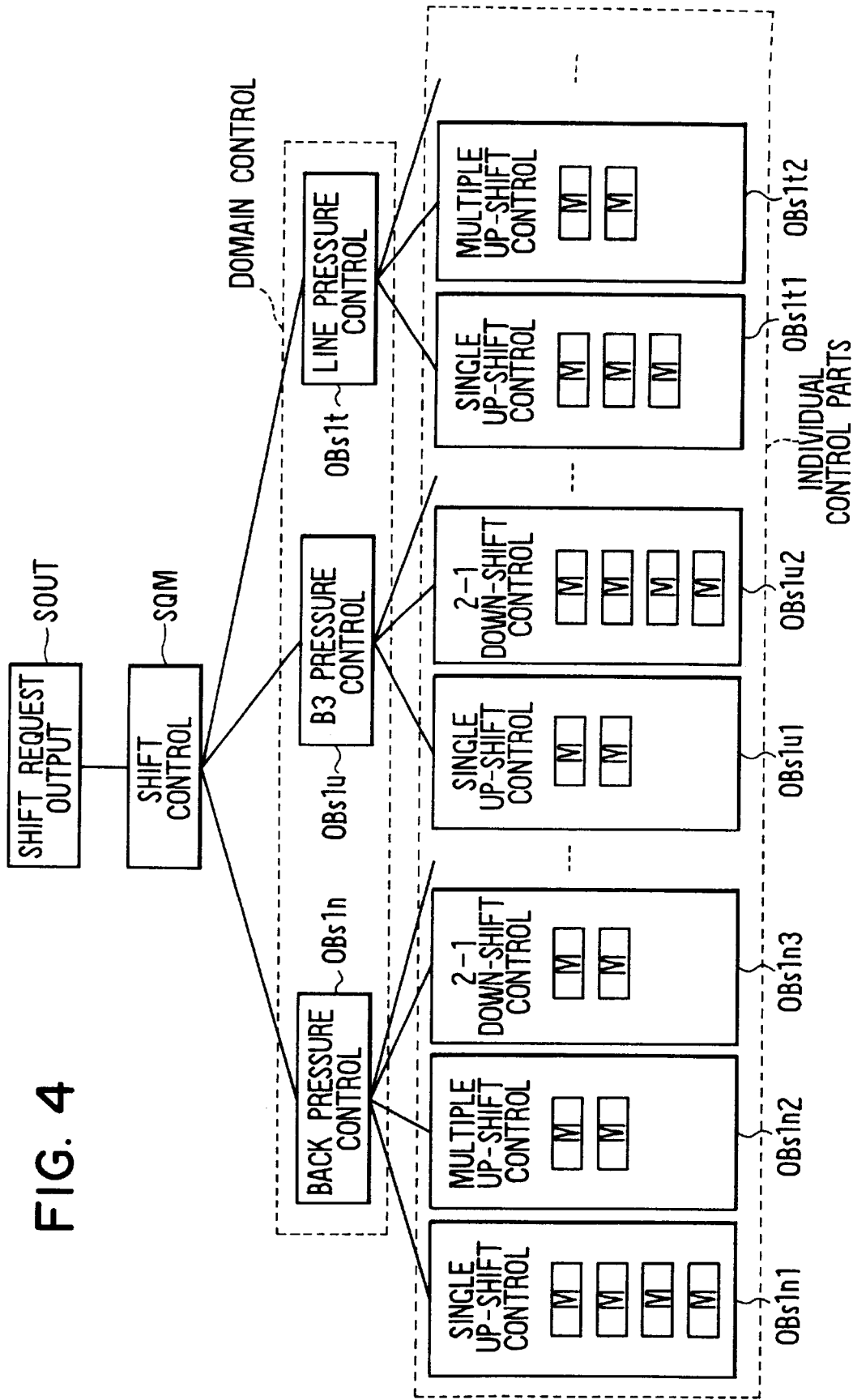
FIG. 4 is an explanatory diagram showing a correlation between a plurality of objects in the first embodiment.

To realize such an operation, in the shifting transition of the automatic transmission, the T-ECU 55 of the present embodiment performs the control according to a plurality of objects (functions) that relate to each other as shown in FIG. 4.

A position shift request output unit SOUT is provided as one object. The unit SOUT is for determining whether position shifting is needed or not (shift position is to be changed or not) based on the predetermined running state, and then determining the shift type when shift change is necessary. Furthermore, a shift control unit SQM is provided as another object. The unit SQM is for controlling the shift control to start or end at the predetermined timing corresponding to the shift type determined by the above shift request output unit SOUT. The unit SQM thus controls the entire shift operation.

The CPU 56 operates as the shift request output unit SOUT described above, and realizing the function of shift type determination. The CPU 56 also operates as the shift control unit SQM described above, thus realizing the function of shift control.

Furthermore, the shift control unit SQM is provided with a plurality of domain control units provided respectively for linear solenoid valves SLN, SLU and SLT for determining the content of drive control process corresponding to the above determined shift type (in the present example, accumulator back pressure control unit OBsln, B3 hydraulic control unit OBslu, and line pressure control unit OBslt) and a plurality of individual control parts (for example, single up-shift control units OBsln2 and OBslt2, multiple up-shift control unit OBsln2 and OBslt2, and 2–1 down-shift control unit OBsln3 and OBslu2, . . . ).

The domain control units (accumulator back pressure control unit OBsln, B3 hydraulic control unit OBslu, and line pressure control unit OBslt) thus corresponds to control determining objects.

The drive control process for the linear solenoid valves SLN, SLU and SLT is categorized into single up-shift (for example, "1st gear→2nd gear", "2nd gear→3rd gear", . . . ) multiple up-shift (for example, "1st gear→2nd gear→3rd gear", "2nd gear→3rd gear→4th gear", . . . ), and 2–1 down-shift (for example, "2nd gear→1st gear" in the case of "1st gear→2nd gear→1st gear", and "2nd gear→1st gear" in the case of "3rd gear→2nd gear→1st gear") depending on the control content. The individual control parts are objects for executing the individual control processes that are categorized depending on the control content described above. Each object has methods that define the content of individual drive control processes.

That is, the individual control parts correspond to drive control object, and are a plurality of individual objects divided depending on the control content. The content of the drive control process divided into sub processes for each shift type, and the divided content is defined in each method of each individual control parts.

In detail, first the accumulator back pressure control unit OBsln is an object provided corresponding to the above linear solenoid valve SLN, which selects and determines the drive control process for driving the linear solenoid valve SLN based on the shift type. The content of the drive control process for driving the linear solenoid valve SLN is defined in the methods of the individual control parts (single up-shift control unit OBsln1, multiple up-shift control unit OBsln2, and 2–1 down-shift control unit OBsln3, . . . ) for each shift type.

The B3 hydraulic control unit OBslu is an object provided corresponding to the above linear solenoid value SLU, which selects and determines the drive control process for driving the linear solenoid valve SLU based on the shift type. The content of the drive control process for driving the linear solenoid valve SLU is defined in the methods of the individual control parts (single up-shift control unit OBslu1, and 2–1 down-shift control unit OBslu2, . . . ) for each shift type.

The line pressure control unit OBslt is an object provided corresponding to the above linear solenoid value SLT, which selects and determines the drive control process for driving the linear solenoid valve SLT based on the shift type. The content of the drive control process for driving the linear solenoid valve SLT is defined in the methods of the individual control parts (single up-shift control unit OBslt1, and 2–1 down-shift control unit OBslt2, . . . ) for each shift type.

Next, the operation realized by means of these objects is described with reference to message sequence charts and flow charts.

Figure 5:
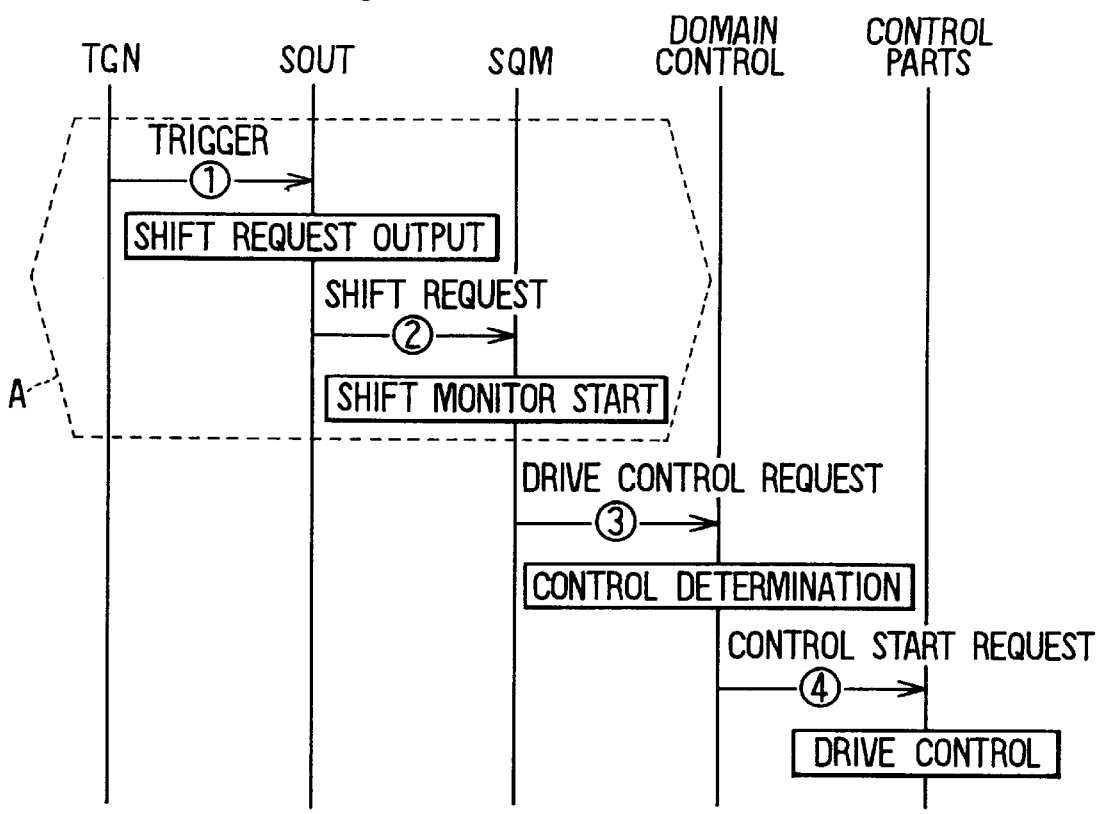
FIG. 5 is a message sequence chart showing a process outline from determination of a shift type to drive control process in the first embodiment.

As shown in the message sequence chart shown in FIG. 5, the memory unit 57 of the T-ECU 55 of the present example is provided with a stored trigger generator TGN for generating a trigger message to the shift request output unit SOUT every predetermined time interval (every 16 ms) as the object other than that described above. When the trigger generator TGN generates and sends a trigger message to the shift request output unit SOUT (①  in FIG. 5), the shift request output unit SOUT executes shift request output routine shown in FIG. 6.

In the shift request output routine, the shift request output unit SOUT determines whether shift is to be operated or not with reference to the shift map stored previously in the memory unit 57 based on the throttle opening and the vehicle speed at step S70. If a negative decision is made (S70: NO), then the shift request output routine is brought to an end immediately for a while. If an affirmative decision (S70: YES) is made, that is, decision that the shift is to be operated, step S72 is executed.

At step S72, the shift type is determined with reference to the position shift diagram based on the throttle opening and vehicle speed. That is, a shift pattern ID is determined. The term "shift pattern ID" means the identification code of the shift type. The shift pattern ID determined herein includes also the shift pattern ID corresponding to the multiple shift and manual shift.

Step S72 is executed to determine the output timing of a message (shift request message) to be supplied to the shift control unit SQM with reference to another data map stored previously in the memory unit 57 based on the information such as the shift pattern ID, states of throttle opening, accelerator switch 9 (in the ON states or OFF states), and states of the lock-up clutch 30 (in the engaged states or disengaged states). The output timing is set based on various timings (timing when shift decision is made and disengaging timing of the lock-up clutch 30) corresponding to the above various information (same in the following).

At step S74, whether the present time is the output timing or not is determined. While the present time is not the output timing (S74: NO), then the shift request output routine is brought to an end for a while. Then, when the shift request output routine is activated again, if the present time is determined to be the output timing (S74: YES), the sequence proceeds to step S76 to generate a message (shift request message) to the shift control unit SQM. The shift request message includes the information of the shift pattern ID.

Figure 7:
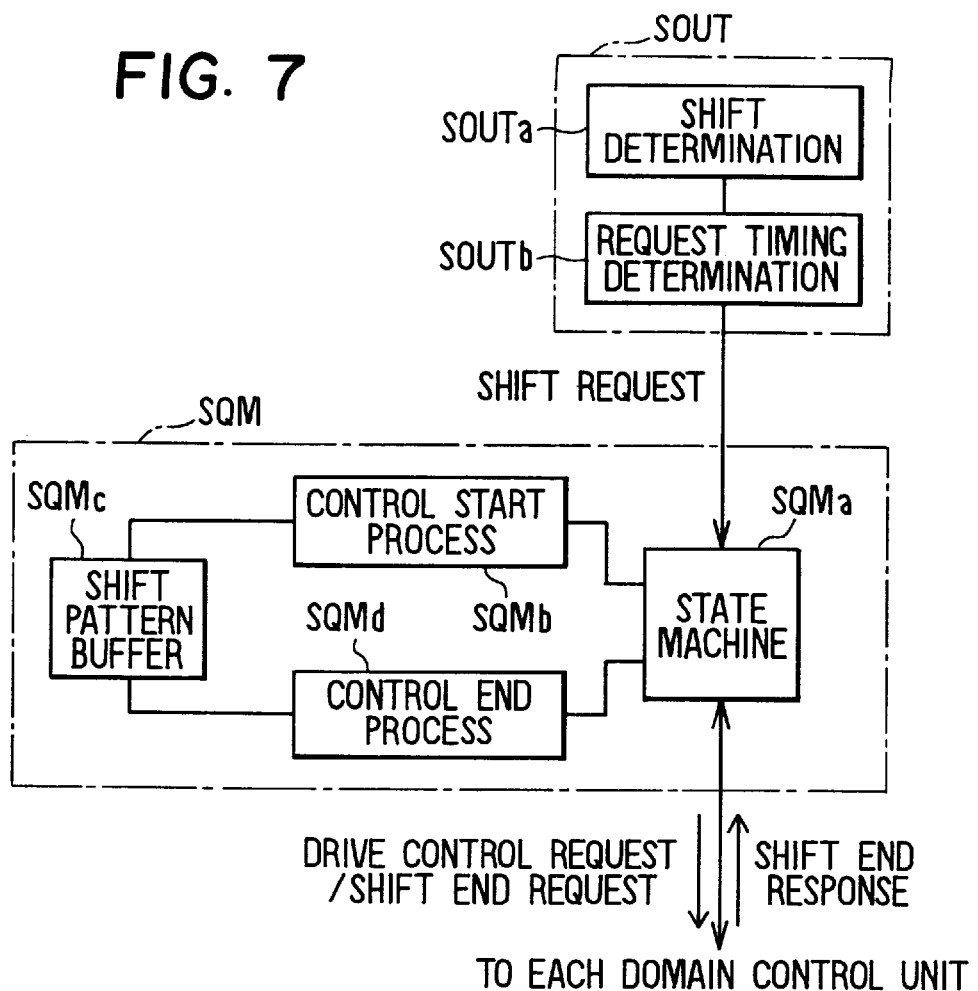
FIG. 7 is an explanatory diagram showing the outline of the object of a shift request output unit and the object of a shift control unit in the first embodiment.

FIG. 7 is a diagram showing the function of the shift request output unit SOUT for executing the shift request output routine described above. In detail, the shift request output unit SOUT is provided with a shift determination unit SOUTa and an output timing determination unit SOUTb, and the shift determination unit SOUTa determines whether shift is to be operated or not. The output timing determination unit SOUTb determines the output timing of the shift request message.

Figure 8:
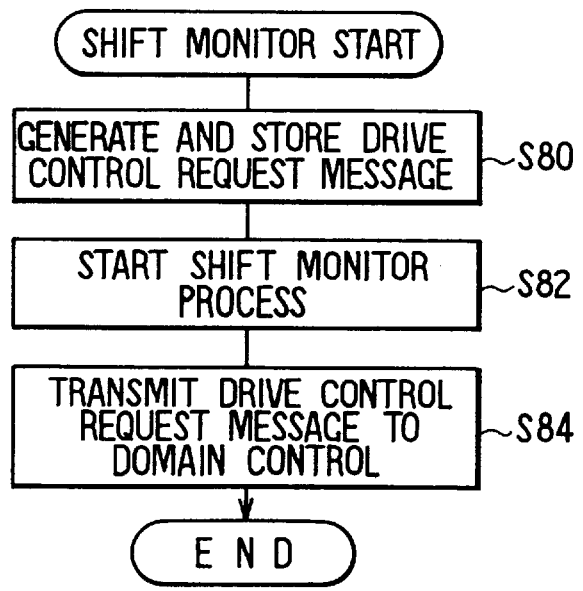
FIG. 8 is a flow chart showing a shift monitor start routine executed in the first embodiment.

Upon receiving the shift request message from the shift request output unit SOUT described above (② in FIG. 5), the shift control unit SQM executes the shift monitor start routine as shown in FIG. 8.

The shift monitor start routine is executed to generate messages (drive control request message) to be distributed to respective domain control units, and the messages are stored in the memory area (FIG. 9B) defined previously in the RAM (S80).

The shift control unit SQM is provided with a plurality of functions as shown in FIG. 7 such as the state machine SQMa, control start processing unit SQMb, and shift pattern buffer SQMc to execute step S80. The state machine SQMa receives the shift request message generated from the shift request output unit SOUT. The control start processing unit SQMb generates drive control request messages to be distributed to the respective domain control units for each domain control unit based on the shift pattern ID included in the transmitted shift request messages. The shift pattern buffer SQMc writes a plurality of generated drive control request messages on the memory area reserved in the RAM for storing the message as shown in FIG. 9.

Figure 9A:
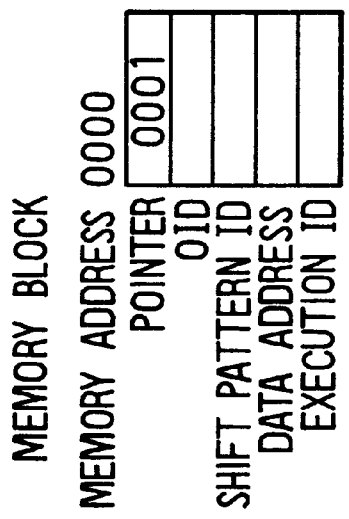
FIGS. 9A and 9B are tables showing message memory areas for storing drive control request messages in the first embodiment.
Figure 9B:
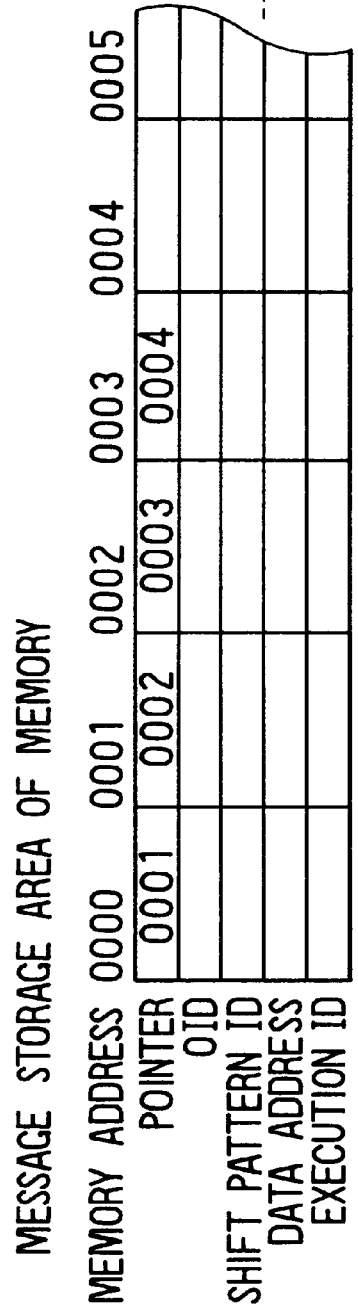

The memory area comprises numerous memory blocks reserved in the RAM one unit of which is a predetermined volume of area (FIG. 9A) equivalent to the size of a drive control request message data to be written. As shown in FIG. 9A, the memory block is provided with a pointer for indicating the order of memory blocks (that is, the pointer in which the address of the next memory block is stored), an OID section for storing an object ID (OID) for indicating the object to which the message is to be supplied, a shift pattern ID section for storing the shift pattern ID, an address section for storing the address of an argument (control data) to be used in the process (that is, method) of the receiver object, and execution ID section for storing the execution ID assigned every time when the drive control request message is written on the message storage memory area by the shift pattern buffer SQMc.

The execution ID is an identification code for identifying the drive control request message supplied from the shift control unit SQM to each domain control unit. In detail, when the shift pattern buffer SQMc writes the drive control request message in the message storage memory area in the state that no content of the message is stored in the message memory area, 1 is assigned as the execution ID and stored in the execution ID section. In the state that the drive control request message having the execution ID of 1 has been stored already in the message memory area, 2 is assigned as the execution ID and stored in the execution ID section.

Because the control start process unit SQMb generates drive control request messages for respective three domain control units, the content of three messages is stored in the memory area. For example, in the state that no message content is stored in the message memory area, 1, 2 and 3 are assigned respectively to three messages as the execution ID, and stored together with the message content.

Next, step S82 is executed to initialize the shift time data and input rotation speed data, and monitoring of the shift control starts newly (S82). The shift control is monitored with reference to the shift time data and input rotation speed data in the shift monitor routine (FIG. 17) described hereinafter.

If the value of the shift time data and input rotation speed data satisfy a predetermined condition, then the shift control is brought to an end. At that time, the shift control is monitored for each shift request messageseparately. When the shift control that has started corresponding to the previous shift request message is continuing, the shift time data and input rotation speed data are initialized to obtain a new variable other than the shift time data and input rotation speed data in the continuing monitoring of the previous shift control.

After step S82 is executed, the drive control request message stored at step S80 is distributed simultaneously to the respective domain control units (S84). "Distribution" means that according to "object ID" included in the drive control request message, the routine of each object having that object ID is activated.

Figure 10:
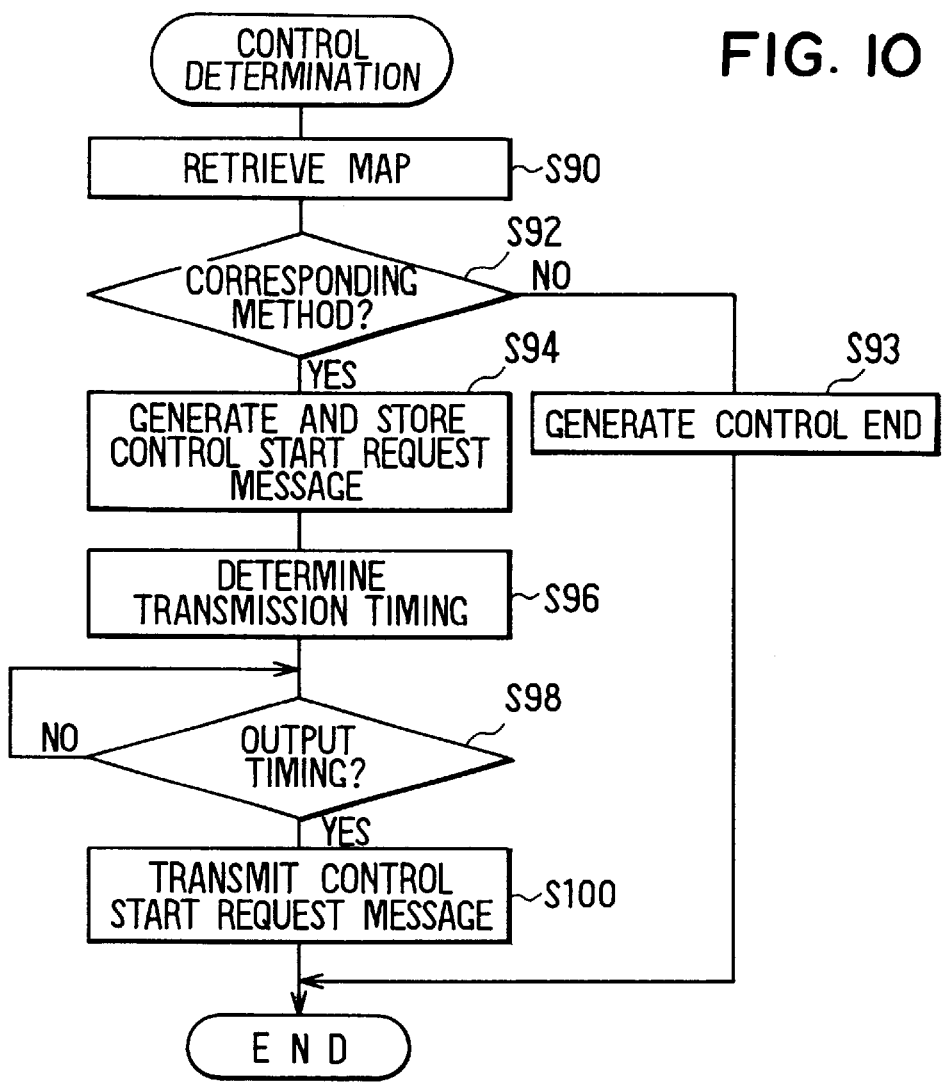
FIG. 10 is a flow chart showing a control determination routine executed in the first embodiment.

Upon receiving the drive control request message from the shift control unit SQM as described above (③ in FIG. 5), each domain control unit starts the control determination routine shown in FIG. 10. The T-ECU 55 of the present example operates by use of one CPU 57, the control determination routine executed by each domain control unit is performed by means of time sharing.

In the control determination routine, step S90 is executed first to retrieve the drive control process corresponding to the shift pattern ID with reference to the method information table in the memory unit 57 based on the shift pattern ID included in the drive control request message supplied from the domain control unit.

Step S92 is executed to determine whether there is the drive control process (that is, method) corresponding to that shift pattern ID or not based on the above reference result. If there is no corresponding method (S92: NO), at step S93 a message to inform the result is generated and sent to the shift control unit SQM. Then, the control determination routine is brought to an end. The routine executed by the shift control unit SQM as a result of step S93 will be described hereinafter (FIG. 14 and FIG. 15) On the other hand, if there is the corresponding method (S92: YES), the sequence proceeds to step S94. The content of the message to be transmitted to the individual control parts (control start request message) is stored in the predetermined memory area. That is, the OID of the individual control parts having the method to be executed is determined based on the shift pattern ID at step S94.

The OID is written in the message storage memory area reserved in the RAM as the control start request message content together with the shift pattern ID included in the drive control request message transmitted from the domain control unit and the storage address and execution ID of the control data to be used. The memory area where the control start request message is to be stored is reserved in the RAM separately from the memory area for storing the above drive control request message. This memory area has the same structure as the memory area shown in FIG. 9 for the drive control request message.

Next, step 96 is executed to determine the output timing for transmitting the control start request message to the individual control parts corresponding to the shift pattern ID included in the drive control request message. When the individual control parts is executing the drive control routine currently, the output timing is determined corresponding to the drive control routine that is currently being executed.

As described hereinafter, when the control start request message is transmitted to the individual control parts, upon receiving the control start request message, the individual control parts starts the drive control routine. When the shift request output unit SOUT generates a shift request message newly before the drive control routine is brought to an end, the shift control unit SQM starts the shift monitor start routine shown in FIG. 8, and the drive control request message is distributed to each domain control unit to thereby execute the control determination routine.

In such a case, each domain control unit determines how to perform the shift control corresponding to the method executed currently by the individual control parts (that is, the shift pattern ID included in the previous drive control request message) and the shift pattern ID included in the drive control request message received this time from the shift control unit SQM. That is, each domain control unit determines the output timing when the control start request message is to be distributed to the individual control parts. The result to be determined is previously decided by the domain control units so that the optimal shift control is performed, for example, the message is transmitted immediately to the individual control parts or the message is transmitted after the drive control process that is being performed currently is ended.

After the output timing is determined at step S96, whether the present time is the output timing or not is determined, and the sequence remains in waiting until the output timing comes at step S98 (S98: NO). When the output timing comes (S98: YES), the control request message is distributed (the method of the individual control parts is activated based on the shift pattern ID) to the individual control parts based on the shift pattern ID at step S100 (④ in FIG. 5), and then the control determination routine is brought to an end.

The method of the individual control parts is activated based on the shift pattern ID at step S100 as described hereunder.

That is, the memory unit 57 is provided previously with the method information table that stores the shift pattern ID correlated to the storage position in the memory unit 57 where the method corresponding to the shift pattern ID is stored. The address of the method is determined with reference to the method information table based on the shift pattern ID, and the method is activated. The method information table is different for each domain control unit. The memory unit 57 that stores the method information table functions as method information memory.

When step S100 of the control determination routine described above is executed in the accumulator back pressure control unit OBsln, the process according to the method for driving the linear solenoid valve SLN for regulating the accumulator back pressure is activated. In detail, the drive control process (accumulator back pressure control routine) according to any one of the methods of a plurality of individual control parts such as single up-shift control unit OBsln1, multiple up-shift control unit OBsln2, and 2–1 down-shift control unit OBsln3 is performed as shown in FIG. 11.

Figure 11:
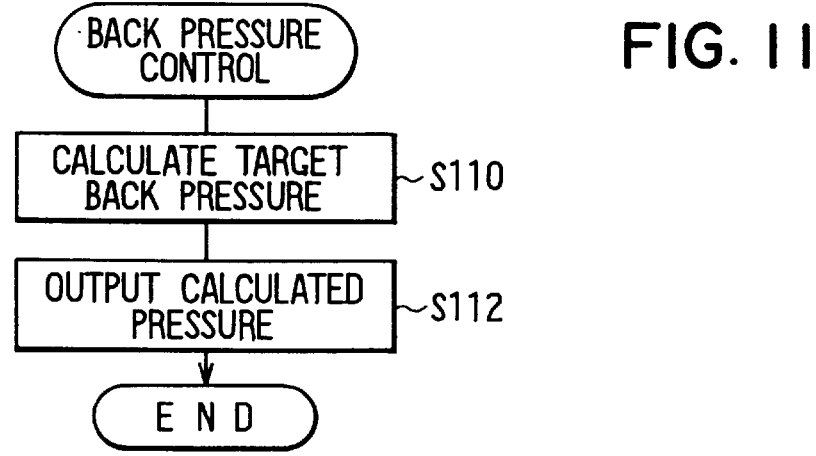
FIG. 11 is a flow chart showing an accumulator back pressure control routine executed in the first embodiment.

In the accumulator back pressure control routine, the control involving the content that is different depending on the shift pattern ID is executed, but the basic scheme of the content is similar for all as shown in FIG. 11. In detail, at step S110 the target accumulator back pressure is calculated based on the parameters such as the input rotation speed, and step S112 is executed to output the calculated value to the predetermined driving circuit as the target accumulator back pressure. As a result, the control signal for regulating the accumulator back pressure to the target accumulator back pressure is supplied to the hydraulic control unit 54, and then the linear solenoid valve SLN is driven.

The accumulator back pressure control routine is activated synchronously with the trigger message supplied every predetermined timing (every 16 ms) from the trigger generator TGN, and repeated until a drive stop request message, which will be described hereinafter, is transmitted to the individual control parts that is performing the drive control process currently.

Similarly, when step S100 of the control determination routine is executed in the B3 hydraulic control unit OBslu, the routine according to the method for driving the linear solenoid valve SLU for regulating the engaging pressure of the third brake B3 is activated. That is, the drive control process (B3 hydraulic control routine) according to any one of the methods of a plurality of individual control parts such as single up-shift control unit OBslu1 and 2–1 down-shift control unit OBslu2 is executed as shown in FIG. 12.

Figure 12:
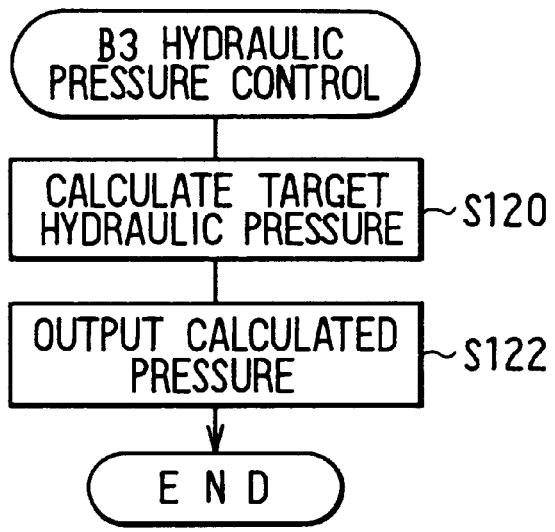
FIG. 12 is a flow chart showing a hydraulic pressure control routine executed in the first embodiment.

In the B3 hydraulic control routine, the control involving the content that is different depending on the shift pattern ID is executed, but the basic scheme of the content is similar for all as shown in FIG. 12. In detail, at step S120 the target B3 fluid pressure that is used to regulate the engaging pressure of the third brake B3 to a correct value is calculated based on the parameters such as input rotation speed, and step S122 is executed to set the calculated value to the predetermined driving circuit as the target B3 fluid pressure. As a result, the control signal for regulating the fluid pressure that determines the engaging pressure of the third brake B3 to the target B3 fluid pressure is supplied to the hydraulic control unit 54, and then the linear solenoid valve SLU is driven.

The B3 hydraulic control routine is activated synchronously with the trigger message supplied every predetermined timing (every 16 ms) from the trigger generator TGN, and repeated until a drive stop request message, which will be described hereinafter, is transmitted to the individual control parts that is performing the drive control process currently.

When step S100 of the control determination routine described above is executed in the line pressure control unit OBslt, the process for driving the linear solenoid valve SLT for regulating the line pressure is activated. In detail, the drive control process (line pressure control routine) according to any one of the methods of a plurality of individual control parts such as single up-shift control unit OBslt1 and multiple up-shift control unit OBslt2 is performed as shown in FIG. 13.

Figure 13:
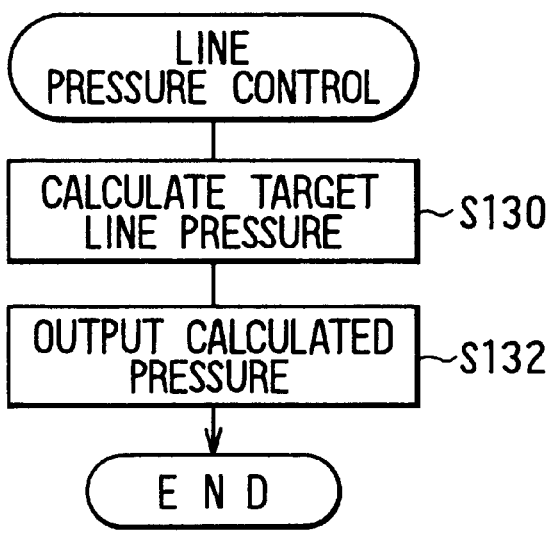
FIG. 13 is a flow chart showing a line pressure control routine executed in the first embodiment.

In the line pressure control routine, the control involving the content that is different depending on the shift pattern ID is executed, but the basic scheme of the content is similar for all as shown in FIG. 13. In detail, at step S130 the target line pressure is calculated based on the parameters such as input rotation speed, and step S132 is executed to set the calculated value to the predetermined driving circuit as the target line pressure. As a result, the control signal for regulating the line pressure to the target line pressure is supplied to the hydraulic control unit 54, and then the linear solenoid valve SLT is driven.

The line pressure control routine is activated synchronously with the trigger message supplied every predetermined timing (every 16 ms) from the trigger generator TGN, and repeated until a drive stop request message, which will be described hereinafter, is transmitted to the individual control parts that is performing the drive control process currently.

In the case that there is no corresponding method in the control determination routine shown in FIG. 10 (S92: NO), the message for informing that result (control end response message described hereinafter) is supplied to the shift control unit SQM as described above, the message communication between objects performed at that time is shown in a message sequence chart of FIG. 14. In a hexagon indicated with A in FIG. 14, the same message communication and process as those shown in the dotted line hexagon (A) in FIG. 5 are performed.

Figure 14:
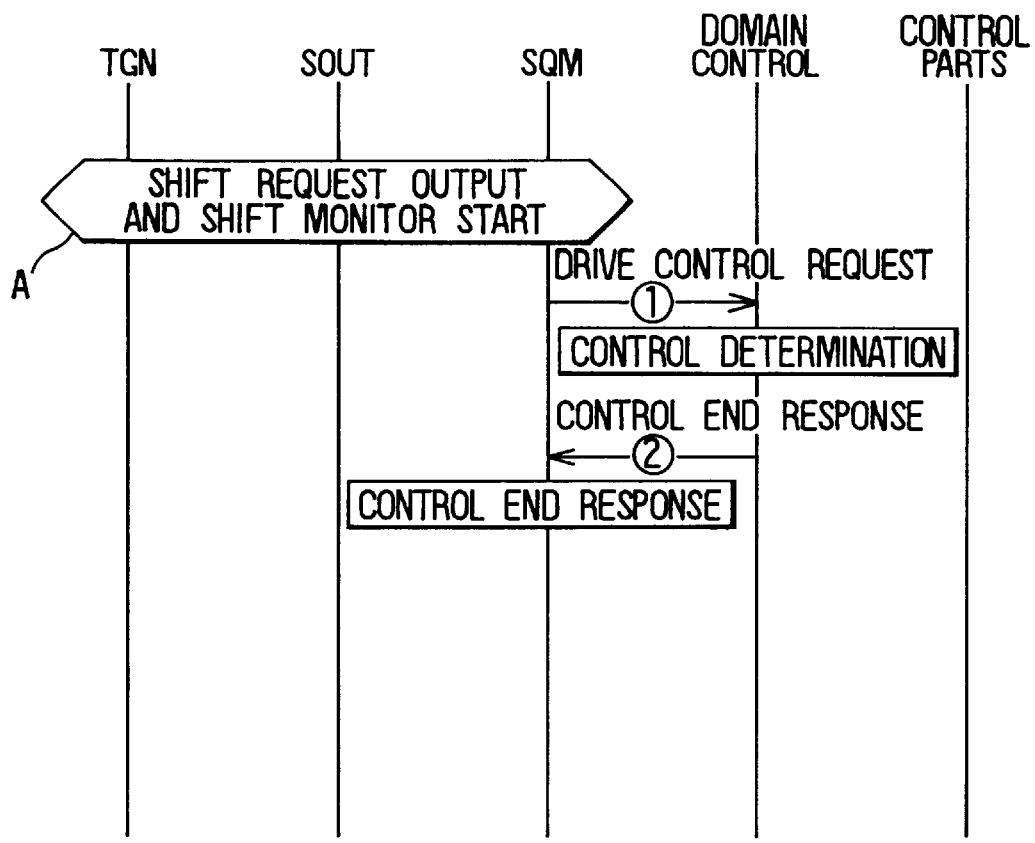
FIG. 14 is a message sequence chart showing a process outline in the case that there is no method to be executed corresponding to the shift type in the first embodiment.

As shown in FIG. 14, when the shift control unit SQM generates the drive control request message (① in FIG. 14), each domain control unit executes the control determination routine described above. The drive control request message includes "execution ID" and "OID" of each domain control unit. When step S93 of the control determination routine is executed, the corresponding domain control unit generates and supplies the control end request response to the shift control unit SQM (② in FIG. 14). The control end response message (② in FIG. 14) is equivalent to response message for informing that there is no drive control process to be performed corresponding to the drive control request message.

Figure 15:
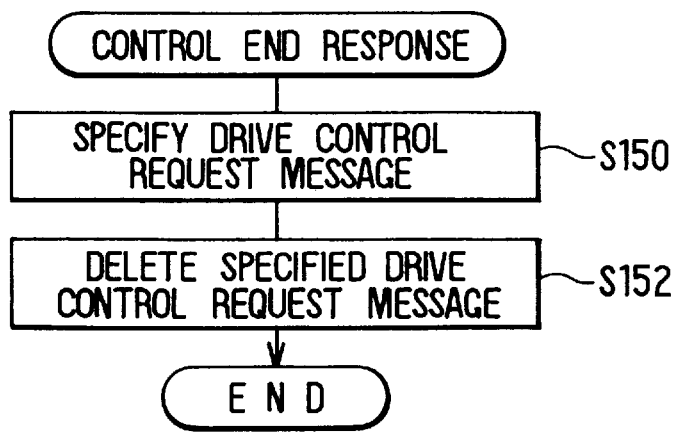
FIG. 15 is a flow chart showing a control end response routine executed in the first embodiment.

Next, upon receiving the control end response message at the state machine SQMa, the shift control unit SQM executes the control end response routine shown in FIG. 15. In the control end response routine, a drive control request message having the execution ID included in the above control end response message is specified selectively from among the drive control request messages stored in the message memory area by means of the function of the shift end processing unit SQMd (S150). The specified drive control request message is deleted from the message memory area by means of the function of the shift pattern buffer SQmc (S152).

In detail, when the shift request message is sent from the shift request output unit SOUT to the shift control unit SQM, the shift control unit SQM generates drive control request messages the number of which is equal to that of domain control units (three in the embodiment), and the respective contents are stored in the message memory area (FIG. 9) in A of FIG. 14. The drive control request messages are supplied to respective domain control units, but if there is no method corresponding to the shift pattern ID included in the drive control request message, then the content of that drive control request message stored in the message memory area is erased.

Figure 16:
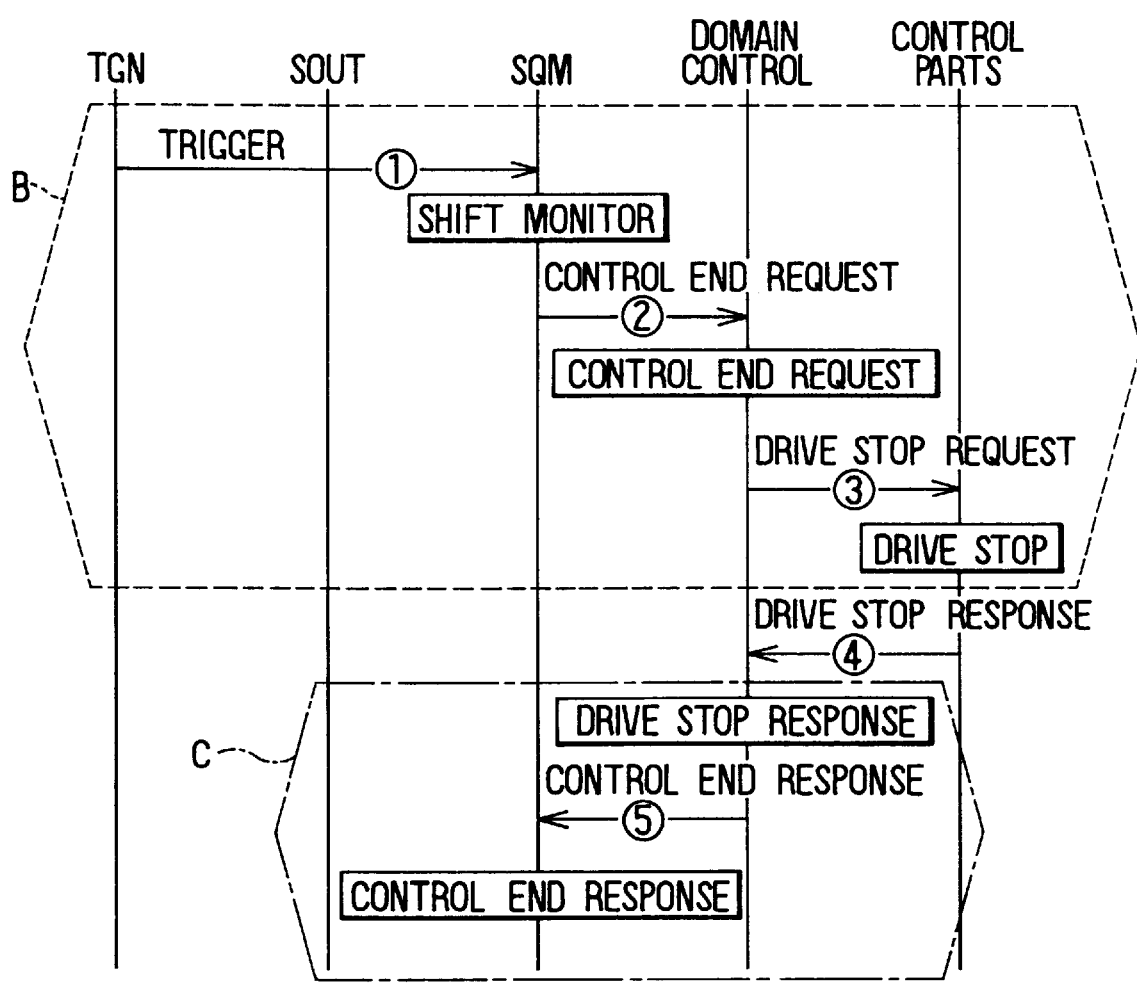
FIG. 16 is a message sequence chart showing a process outline from the determination of an end timing of the shift control to the end of the shift control in the first embodiment.

When the shift time data and input rotation speed data are initialized at step S82 in the shift monitor start routine (FIG. 8) described above, the monitoring of the shift control starts newly. If the shift time data and input rotation speed data satisfy the predetermined shift end condition, then the shift control unit SQM generates the control end request message, and driving of the linear solenoid valves by means of the respective individual control parts is stopped. The message sequence chart shown in FIG. 16 shows such sequential process.

The shift control unit SQM monitors the shift control in the shift monitor routine. In the shift monitor routine, the shift control unit SQM executes the routine synchronously with the trigger message (①) in FIG. 16) supplied every predetermined time interval (every 16 ms) from the trigger generator TGN as shown in FIG. 16.

The monitoring of the shift control (that is, shift monitor routine) is not discontinued even if a new shift request message is transmitted to the shift control unit SQM during the monitoring. In detail, when a new shift request message is received, the monitoring of another shift control corresponding to the new shift request is started without discontinuing of shift monitor routine that is continuing currently. Accordingly, the shift monitor routine is executed in parallel separately every time when a shift request message is transmitted to the shift control unit SQM. The end timing when the shift control is to be ended is determined separately in the respective shift monitor routines, and the control end request message (②) in FIG. 16) is generated.

Figure 17:
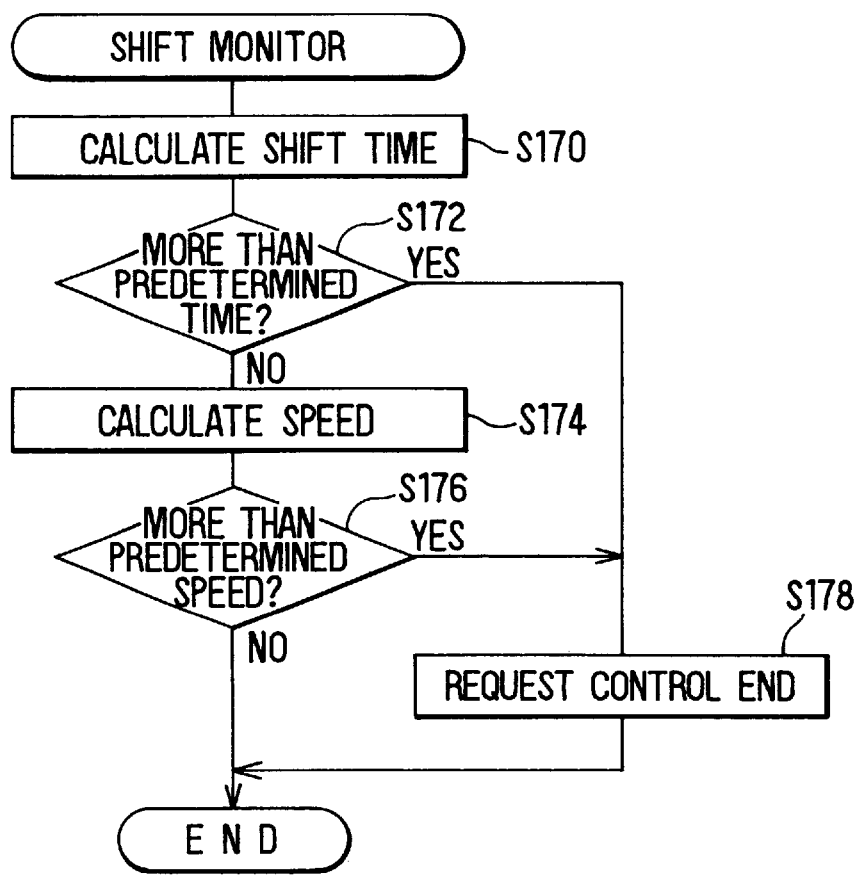
FIG. 17 is a flow chart showing a shift monitor routine executed in the first embodiment.

The operation of the monitoring of the shift control is described hereunder. As shown in FIG. 17, when the shift monitor routine is activated, first the elapsed time (shift time) from the initialization of the shift time data is calculated with reference to the shift time counter provided in the T-ECU 55 (S170). Whether the calculated shift time exceeds the predetermined time set corresponding to the shift pattern ID or not is determined (S172). If the shift time does not exceed the predetermined time (S172: NO), then step S174 is executed to determine the input rotation speed.

Step S176 is executed to determine whether the input rotation speed determined in the above step S174 reaches to the predetermined rotation speed that is set corresponding to the vehicle speed and the shift pattern ID or not. If the rotation speed does not reach to the predetermined rotation speed (S176: NO), then the shift monitor routine is ended temporarily, and the shift monitor routine is started again from step S170 process in response to the next trigger message supplied from the trigger generator TGN.

On the other hand, if the shift time is determined to exceed the predetermined time (YES) at step S172 or if the input rotation speed is determined to reach to the predetermined rotation speed (YES) at step S176, the shift control unit SQM supplies the control end request message (②) in FIG. 16) to some domain control units (S178). In this case, the control end request message is supplied to not all the domain control units.

The content of the drive control request message stored in the message area of the RAM is referred based on the execution ID (a plurality of "execution ID" assigned in the step S80 process in FIG. 8) corresponding to the shift monitor routine that is continuing currently, and the OID of the domain control unit that performs the shift control corresponding to that execution ID is determined. The control end request message is supplied to only the domain control unit having the determined OID. The control end request message includes the execution ID.

Figure 18:
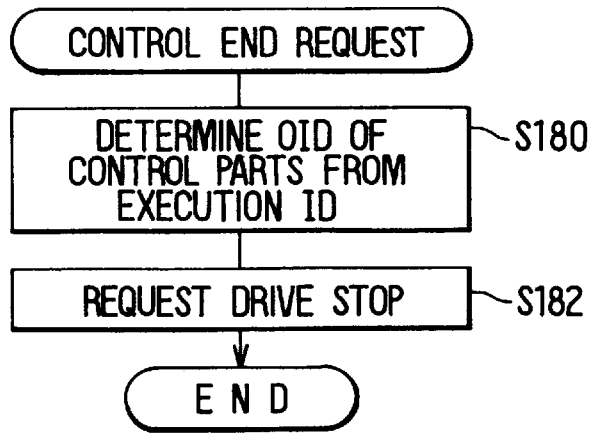
FIG. 18 is a flow chart showing a control end request routine executed in the first embodiment.

The domain control unit that has received the control end request message supplied from the shift control unit SQM as described above executes the control end request routine shown in FIG. 18.

In the control end request routine, first step S180 is executed to determine the OID of the individual control parts that performs the drive control of the linear solenoid valve corresponding to the execution ID with reference to the content of the control start request message stored in the message memory area of the RAM based on the execution ID included in the control end request message (②) in FIG. 16). Then, step S182 is executed to send the drive stop request message that includes the execution ID to the individual control parts that has the determined OID (③) in FIG. 16).

Figure 19:
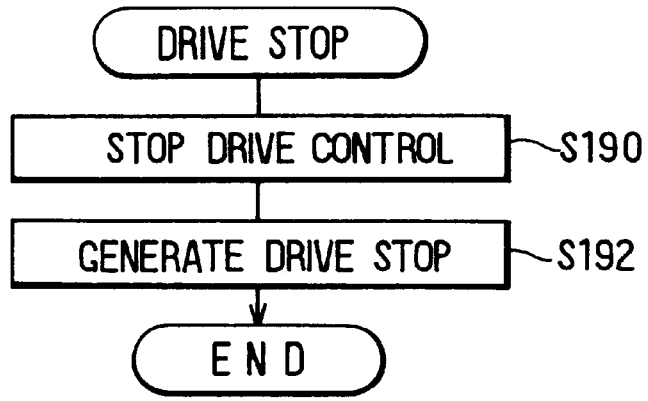
FIG. 19 is a flow chart showing a drive stop routine executed in the first embodiment.

The individual control parts that has received the drive stop request message executes the drive stop routine shown in FIG. 19. In the drive stop routine, step S190 is executed to stop the drive control process (FIG. 11, FIG. 12 and FIG. 13), and at step S190 the output value of the control signal supplied to each linear solenoid valve is changed to the predetermined default value (that is, the value in the state that the shift control is not being performed). Then, step S192 is executed to send the drive stop response message for informing that the drive control operation has been stopped or ended (④) in FIG. 16) to the domain control unit that is the sender of the drive stop request message (S192). The drive stop response message includes the informed execution ID included in the drive stop request message.

For example, in the case that the individual parts is an object that drives the linear solenoid valve SLN such as the single up-shift control unit OBsln1, multiple up-shift control unit OBsln2, or 2–1 down-shift control unit OBsln3, the accumulator back pressure control routine shown in FIG. 11 is stopped (S190) and the drive stop response message is supplied to the accumulator back pressure control unit OBsln (S192).

Furthermore, in the case that the individual parts is an object that drives the linear solenoid valve SLU such as the single up-shift control unit OBslu1 or 2–1 down-shift control unit OBslu2, the B3 hydraulic control routine shown in FIG. 12 is stopped (S190) and the drive stop response message is supplied to the B3 hydraulic control unit OBslu (S192).

In the case that the individual parts is an object that drives the linear solenoid valve SLT such as the single up-shift control unit OBslt1 or multiple up-shift control unit OBslt2, the line pressure control routine shown in FIG. 13 is stopped (S190) and the drive stop response message is supplied to the line pressure control unit OBslt (S192).

Figure 20:
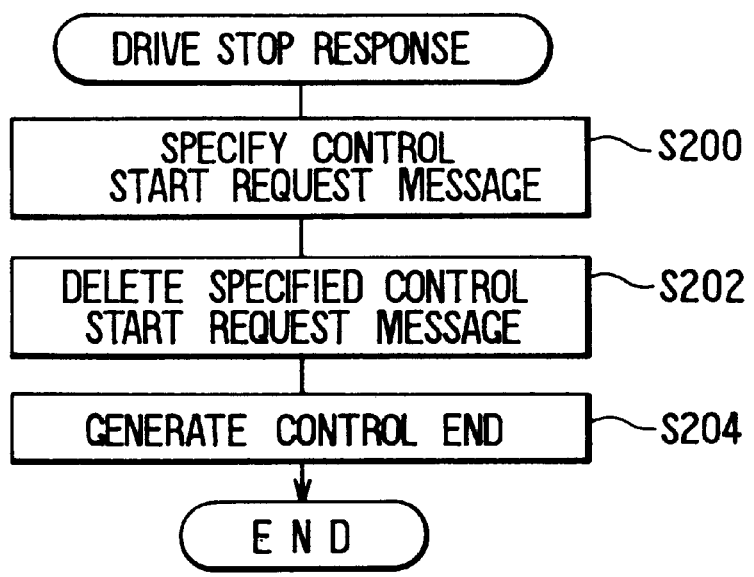
FIG. 20 is a flow chart showing a drive stop response routine executed in the first embodiment.

Upon receiving the drive stop response message from the individual parts, the domain control unit executes the drive stop response routine shown in FIG. 20. In the drive stop response routine, a control start request message that has the execution ID included in the above drive stop response message is specified selectively from among the control start request messages stored in the message memory area (S200), and the content of the specified control start request message is deleted from the message memory area (S202). The same control end response message (⑤) in FIG. 16) described above is sent to the shift control unit SQM (S204). The control end response message (⑤) in FIG. 16) is equivalent to the end message for informing that the drive control process has been ended.

As a result, the control end response routine shown in FIG. 15 is activated, a drive control request message having the execution ID included in the above control end response message is deleted selectively from among the drive control request messages stored in the message memory area as described above (S151 and S152).

Figure 21:
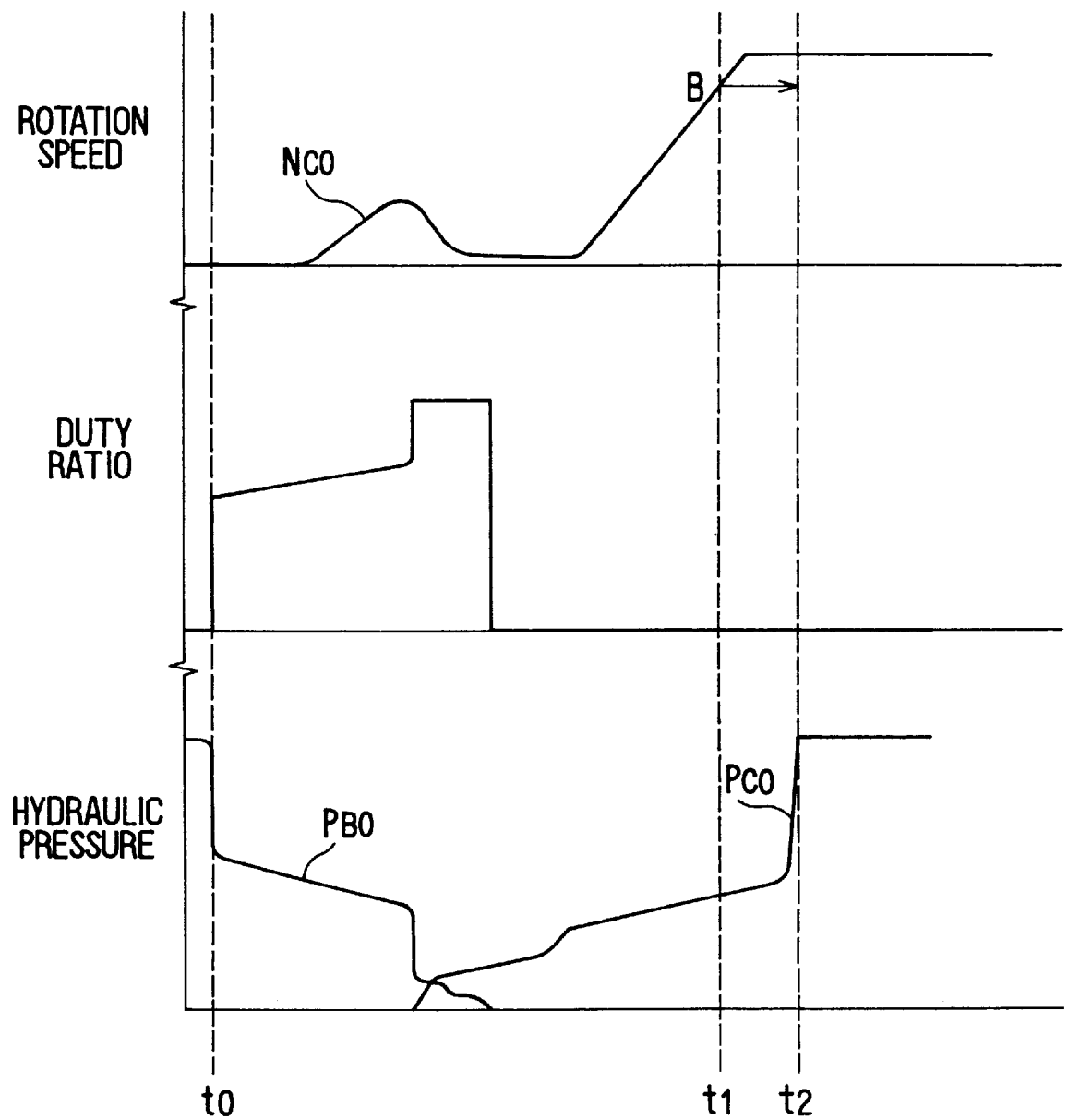
FIG. 21 is a time chart showing an exemplary shift control attained in the first embodiment.

According to the first embodiment, for example, the shift control operation as shown in FIG. 21 is performed.

The shift request output unit SOUT determines the shift pattern ID and then supplies the shift request message to the shift control unit SQM. The shift control unit SQM then generates the drive control request messages and supplies them to respective domain control units, and each domain control unit distributes the control start request message to the individual control parts. As a result, the accumulator back pressure control routine (FIG. 11), B3 hydraulic control routine (FIG. 12), and line pressure control routine (FIG. 13) corresponding to the shift pattern ID determined as described above are started at time t0.

The respective linear solenoid valves are subjected to the drive control process so that the input rotation speed NCO is equalized to the target rotation speed determined by means of various parameters such as the vehicle speed and shift pattern ID.

In detail, in the line pressure control routine, the linear solenoid valve SLT is subjected to the drive control with the duty ratio of the behavior that is previously set to the shift pattern ID. In the B3 hydraulic control routine, the linear solenoid valve SLU is subjected to the drive control so that the fluid pressure PBO for regulating the engaging pressure of the third brake B3 varies corresponding to the mode of the shift pattern ID. In the accumulator back pressure control routine, the linear solenoid valve SLN is subjected to the drive control so that the fluid pressure PCO for regulating the accumulator back pressure varies corresponding to the mode of the shift pattern ID.

The shift control unit SQM executes the shift monitor routine to determine the shift end timing (that is, output timing of the control end request message) from the shift time data and input rotation speed data. For example, the input rotation speed exceeds the rotation speed B determined by means of various parameters such as the vehicle speed and shift pattern ID at time t1. The shift control unit SQM supplies the control end request message that includes the execution ID to each domain control unit, the drive control process performed by each individual control parts is stopped and the shift control operation is brought into an end at time t2.

FIG. 21 shows an example that involves a certain shift type. However, the shift type to be determined (that is, the shift pattern ID) varies if the parameter such as vehicle speed or throttle opening is different, and concomitantly the detailed control content of the drive control process for driving the linear solenoid valves and target rotation speed is different.

According to the first embodiment, because objects are provided for respective linear solenoid valves SLN, SLU and SLT, the memory area required to store the program is reduced, and thus the memory resource is used effectively.

The domain control units provided for the respective linear solenoid valves SLN, SLU and SLT determine the method to be executed corresponding to the shift pattern ID (that is, shift type), respectively. As a result, in the case that the specification of the linear solenoid valves SLN, SLU or SLT is changed, only by revising the domain control unit and individual control parts corresponding to the linear solenoid valve SLN, SLU or SLT that is subjected to the specification change, not only the specification change is attained easily but also the program revision work and cost are reduced.

The content of the drive control process of each linear solenoid valve SLN, SLU and SLT is divided into methods corresponding to each shift type. As a result, the drive control function is independent for each shift type, and the program can be revised more easily. For example, in the case the specification of the drive control process of a part of the shift type is to be changed, only the corresponding method may be corrected, the point to be corrected is found easily and revised easily.

The memory unit 57 stores the method information table in which the address of the method is correlated to the shift pattern ID. Therefore, in the case that the storage position in the memory unit 57 of the method (or the object having this method) has been changed concomitantly with design change of the program, the change is attained easily only by changing the storage position of the method stored corresponding to the method information stored in the method information table that is, the shift type information.

The content of a drive control request message that has no method corresponding to the shift pattern ID is erased selectively from among the drive control request messages supplied to the respective domain control units from the message area. Only the content of drive control request messages that have the method corresponding to the shift pattern ID remains unerased. As a result, the linear solenoid valve SLN, SLU or SLT that is subjected to the drive control process can be recognized corresponding to the determined shift type (that is, the shift pattern ID). The timing (end timing) when the drive control process that is continuing currently is to be ended is detected based on the predetermined ending condition. Thus, the drive control process can be ended accurately at the end timing.

Because the content of the drive control request message that has no method corresponding to the shift pattern ID is erased selectively from among the drive control request messages supplied to the domain control units from the message memory area, the drive control request message that is not necessary to monitor the drive control process is prevented from remaining in the memory unit 57, and the memory resource is used effectively.

Because the content of the drive control request message corresponding to the ended drive control process is deleted from the message memory area when the drive control process is ended, the memory resource is used more effectively.

The domain control units and individual control parts are provided as the objects provided for respective linear solenoid valves SLN, SLU and SLT. Therefore, in the case that the specification of the linear solenoid valves SLN, SLU or SLT is changed, only by changing the individual control parts, the specification change is accommodated, and the program part that defines the drive control process for the linear solenoid valves SLN, SLU and SLT is significantly independent as a whole, and the design of the whole system can be changed easily.

Each individual control parts is the object divided corresponding to the control content, that is, the drive control function is divided for each individual control parts corresponding to the control content. As a result, the program part that defines the drive control process is independent in the whole program, and the design of the whole system can be changed more easily.

The drive control request message, the control end request message, and drive stop response message supplied to the respective domain control units, and the drive stop request message supplied to the individual drive parts all includes the OID of the receiver object (that is, domain control unit or individual control parts). These messages are distributed by the message distribution object provided with a connection information data based that is stored correlatively to the storage position information of the memory unit 57 where the OID and the object indicated by the OID are stored. The message distribution object specifies the execution start address of the object corresponding to the OID of the message with reference to the memory content of the above connection information data base, and transfers it to the process according to the object that is the receiver of the message.

Therefore, in the case that the storage position of the object (that is, domain control unit or individual control parts) in the memory unit 57 is changed when the object is corrected concomitantly with the design change of the program, only by changing the content of the above connection information data base, the storage position change is accommodated. That is, each object is independent and the design of the program is changed easily.

(Second Embodiment)

Figure 22:
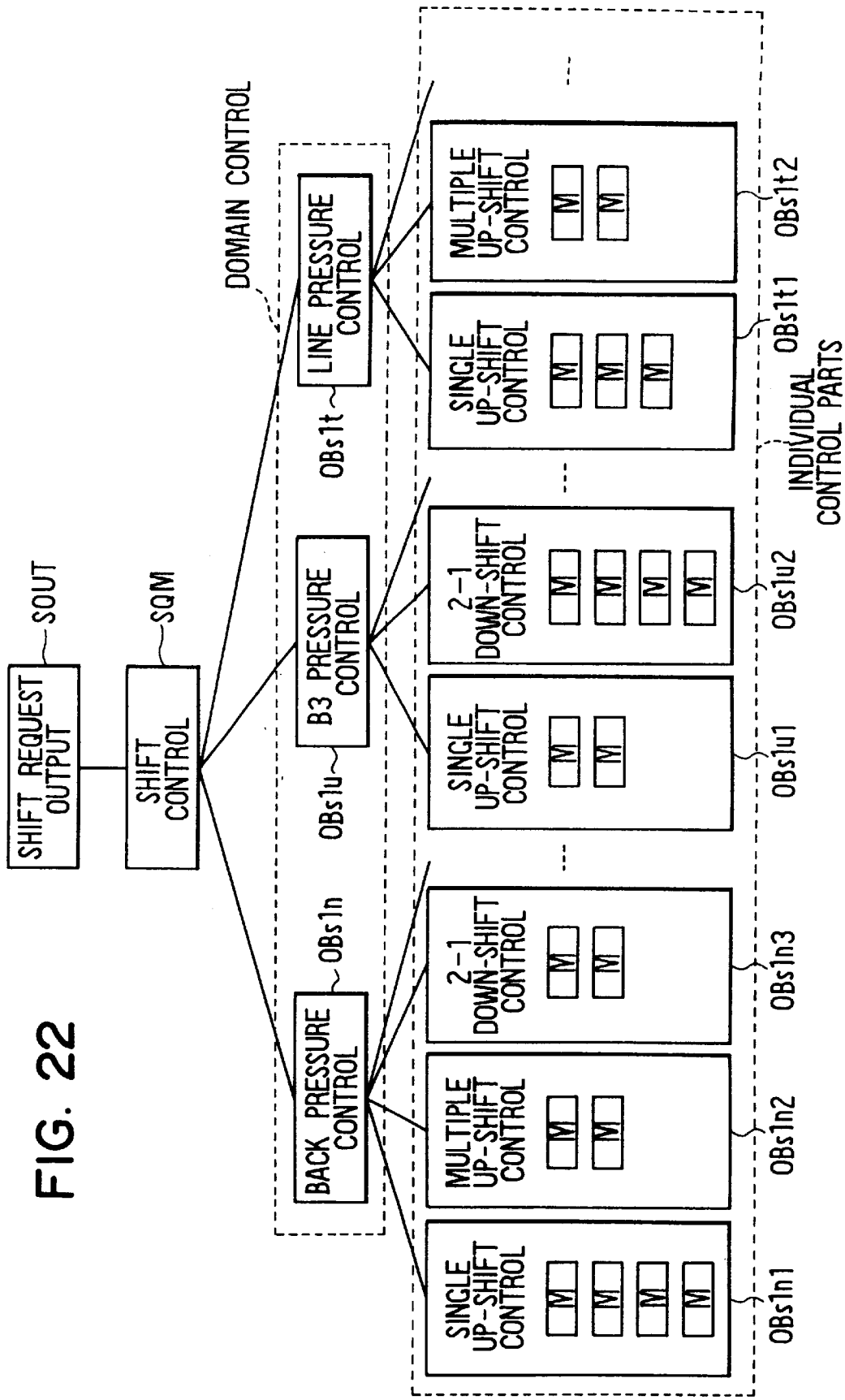
FIG. 22 is an explanatory diagram showing a correlation relation between a plurality of objects in a second embodiment of the present invention.

A second embodiment is constructed similarly as the first embodiment (FIGS. 1 to 3), and the control program is provided based on the above object-oriented programming as shown in FIG. 22 which is the same as FIG. 4. In this embodiment, the domain control unit (OBsln, OBslu, OBslt) operates as a management object, and takes into the degree of progress of shifting further consideration in controlling gear-shifting operation.

Next, the operation realized by means of these objects is described with reference to message sequence charts and flow charts.

Figure 6:
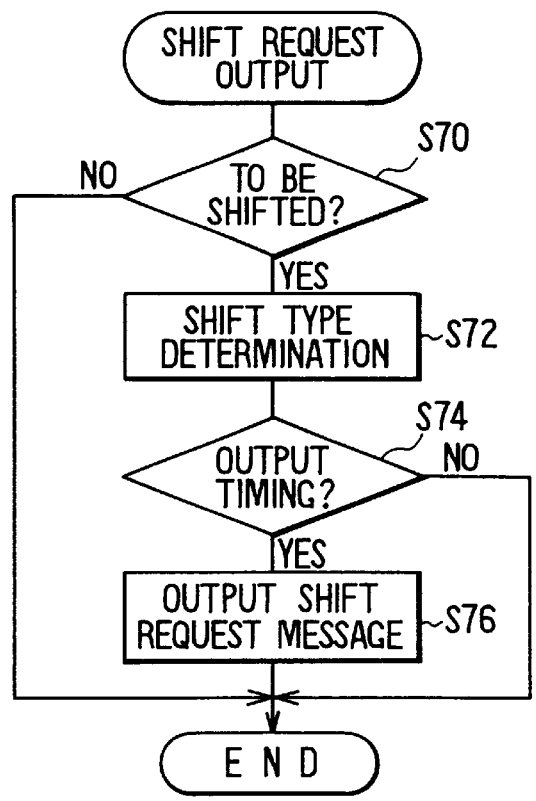
FIG. 6 is a flow chart showing a shift request output routine executed in the first embodiment.
Figure 23:
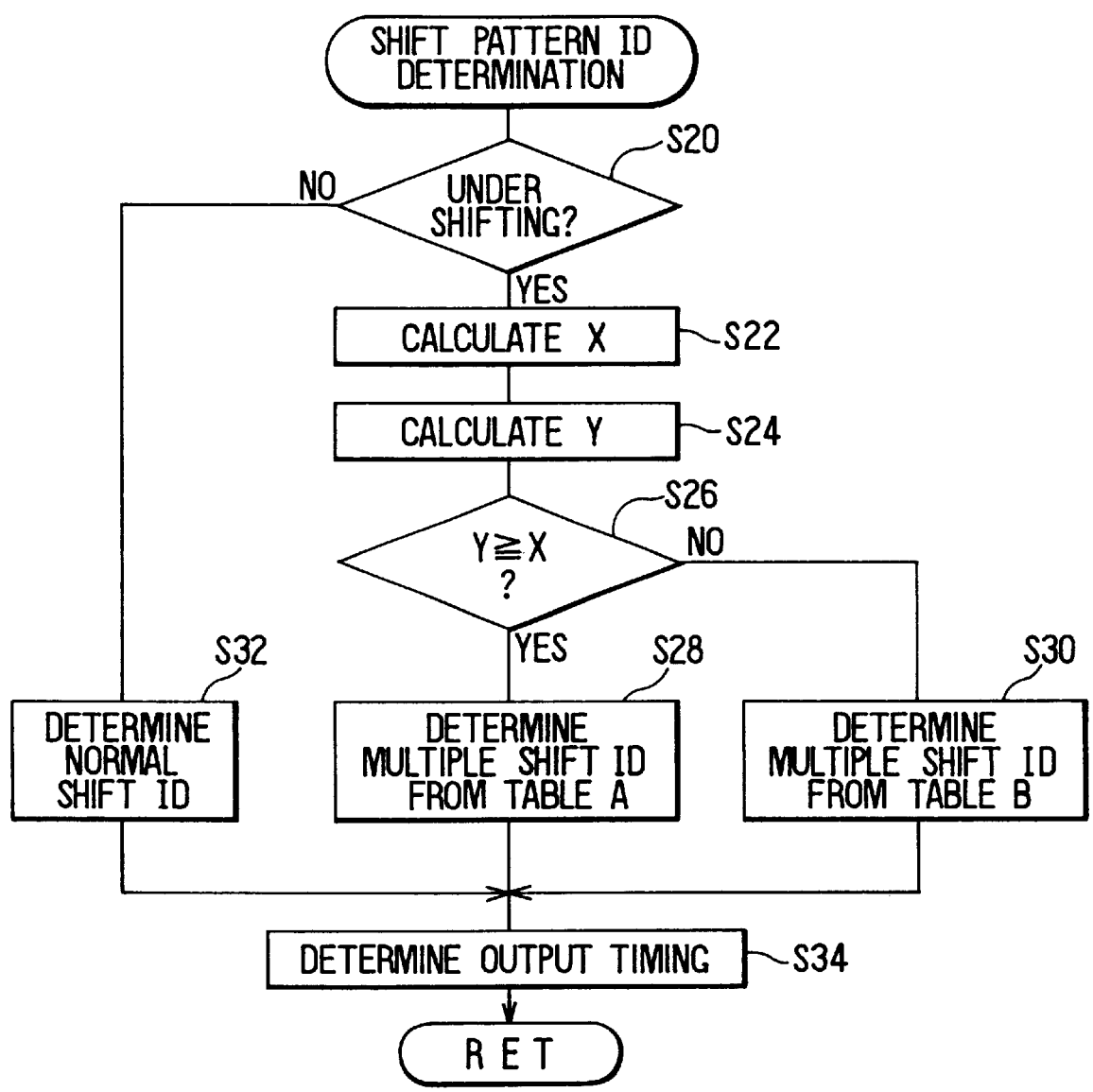
FIG. 23 is a flow chart showing a shift pattern IDs determining routine executed according to a shift request output unit object in the second embodiment.

First, the second embodiment operates as shown in the message sequence chart shown in FIG. 5, and executes the shift request output routine shown in FIG. 6. However, the shift pattern determination at step S72 (FIG. 6) is executed as shown in FIG. 23.

Specifically, when the shift pattern ID determination routine is activated, first at step S20, whether the shifting is continuing currently or not is determined. If the negative result is obtained (S20: NO), then the shift control is determined to be the normal shift and not the multiple shift, and then at step S32 the shift pattern ID (that is, the identifying code for indicating the shift type) is determined and the sequence proceeds to step S34 that will be described hereinafter.

On the other hand, if the affirmative result is obtained at step S20 (S20: YES), then the reference value X used for detecting the shifting stage of the shift control that is being performed currently is determined. In detail, the reference value X is determined with reference to the table in which the reference value X is set previously based on the type of the shift control that is being performed currently and the power ON/OFF state (whether power is ON state or OFF state).

At step S24 subsequent to step S22, the shifting stage parameter Y for indicating the degree of completion of the shift control that is being performed currently is calculated. In detail, [(input rotation speed)−(output shaft rotation speed)×(transmission gear ratio)] is calculated as the shifting stage parameter Y because the input shaft rotation speed is equalized to the product of the output shaft rotation speed and the transmission gear ratio (transmission gear ratio of the shift position to which the gear is changed) when the shift control is completed.

At step S26, the magnitude of the reference value X and the shifting stage parameter Y are compared. For example, in the case of down-shift, because the (input shaft rotation speed) increases with increasing the progress of the shift control, the (input shaft rotation speed) comes near to the value (output shaft rotation speed)×(transmission gear ratio). In detail, the shifting stage parameter Y comes near to "0" from the negative side. Therefore if the shift stage parameter Y is larger than the reference value X, it is determined that the shift control proceeds to some degree.

On the other hand, in the case of up-shifting, because (input shaft rotation speed) decreases with increasing the progress of the shift control, and the (input shaft rotation speed) comes near to the value (output shaft rotation speed)×(transmission gear ratio). In detail, the shifting stage parameter Y comes near to "0" from the positive side, and if the shifting stage parameter Y is smaller than the reference value X, it is determined that the shift control proceeds to some degree.

As described above, at step S26, the magnitude of the reference value X and the shifting stage parameter Y are compared, and a table to be referred to determine the multiple shift pattern ID is selected differently depending on the comparison result. In detail, in the case of "reference value X"≦"shifting stage parameter Y" (S26: YES), the sequence proceeds to step S28 and the shift pattern ID is determined based on the shift type, and the multiple shift pattern ID is determined with reference to the table A based on the shift type, throttle opening, and engaging state of the engaging units of the automatic transmission.

On the other hand, if the case of "reference value X">"shifting stage parameter Y" (S26: NO), the sequence proceeds to step S30, the shift pattern ID is determined based on the shift type, and the multiple shift pattern ID is determined with reference to another table B other than the above table A based on the shift type, throttle opening, and the engaging state of the engaging units of the automatic transmission. That is, the multiple shift pattern ID is an identifying code that collectively indicates the shifting stage of the shift control that is being performed currently and other various information to be considered for multiple shifting (for example, throttle opening and engaging state of the engaging units of the automatic transmission). That is, the multiple shift pattern ID functions as "shifting stage information".

In some cases, various information that indicate the state of the vehicle are used for determination of the multiple shift pattern ID in addition to the above information (shift type, throttle opening, and engaging state of the engaging units of the automatic transmission).

The shift pattern ID and the necessary multiple shift pattern ID determined in any one of steps S28, S30, and S32 as described above are supplied as the shift request message as described hereinafter, and the output timing of the shift request message is determined in the process at step S34.

In detail, the processes at step S34 are executed after the processes at steps S28, S30 and S32, and the output timing of the shift request message is determined with reference to another table that is stored previously in the memory unit 57 based on the information such as the shift pattern ID, multiple shift pattern ID, throttle opening, state of accelerator pedal sensor 9 (power ON state or power OFF state), and state of lock-up clutch 30 (engaging state or disengaging state). The output timing is set with reference to various timings (the timing when the shift determination is established and disengaging timing of the lock-up clutch 30) depending on the above various information.

Figure 24:
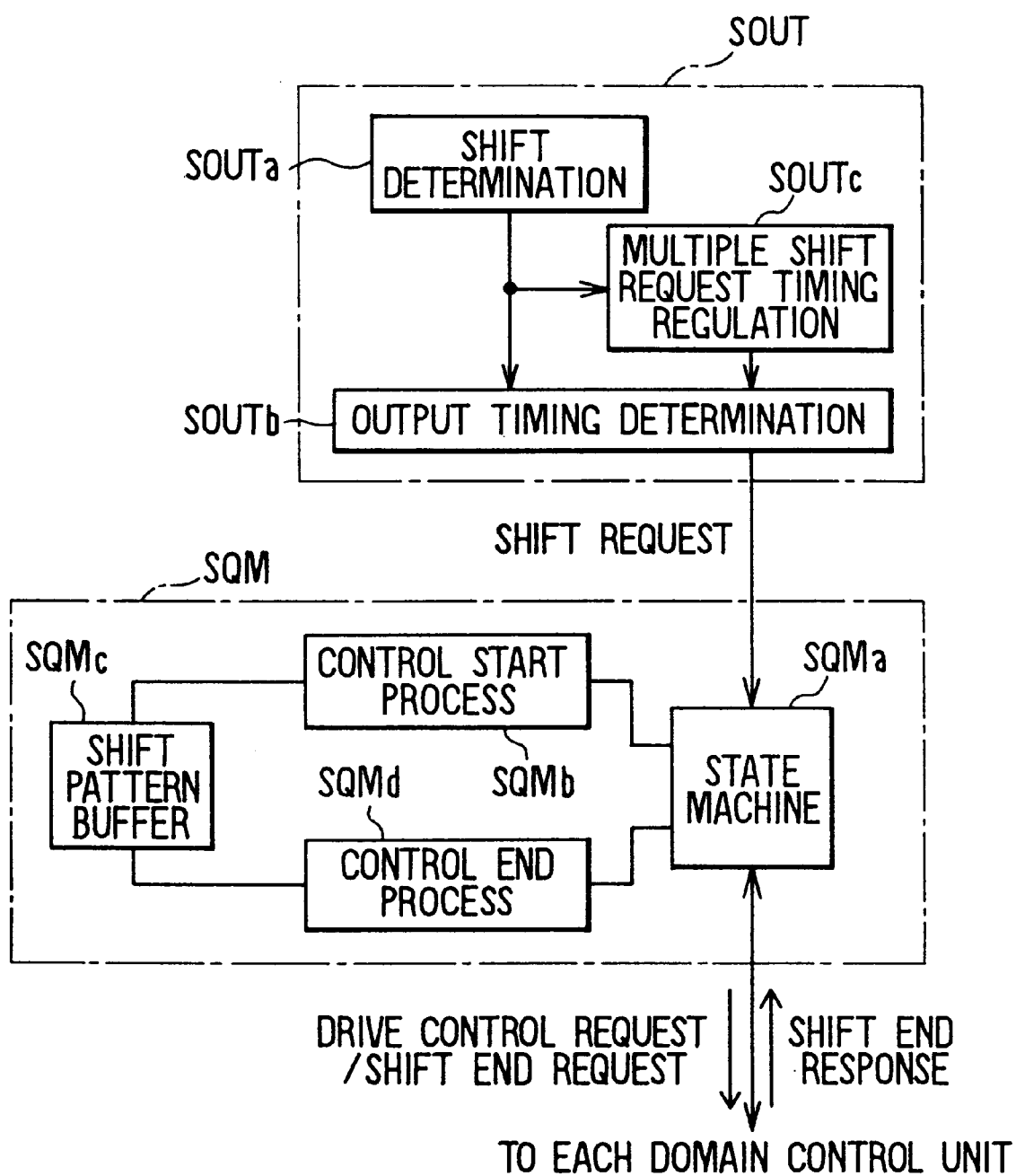
FIG. 24 is an explanatory diagram showing a function of the shift request output unit object and shift control unit object in the second embodiment.

After the shift pattern ID determination routine (FIG. 23) steps 74 and 76 (FIG. 6) is executed. FIG. 24 is a diagram showing the function of the shift request output unit SOUT for executing the shift request output routine described above. In detail, the shift request output unit SOUT is provided with a shift determination unit SOUTa and an output timing determination unit SOUTb. The shift determination unit SOUTa determines "whether shift is to be operated or not" and determines the shift pattern ID and necessary multiple shift pattern ID.

The output timing determination unit SOUTb determines the output timing of the shift request message based on the shift pattern IDs. A multiple shift request timing regulation unit SOUTc generates the correction information of output timing of the shift request message based on the multiple shift pattern ID to thereby allow the output timing determination unit SOUTb to determine the output timing in view of multiple shift. The shift control unit SQM is the same as in the first embodiment (FIG. 7).

Figure 25A:
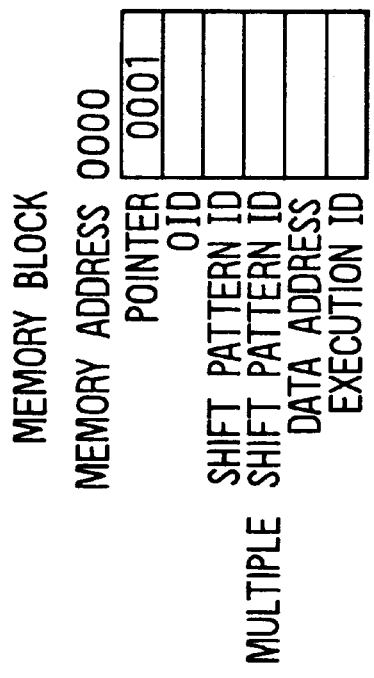
FIGS. 25A and 25B are tables showing the drive control request message memory areas in the second embodiment.
Figure 25B:
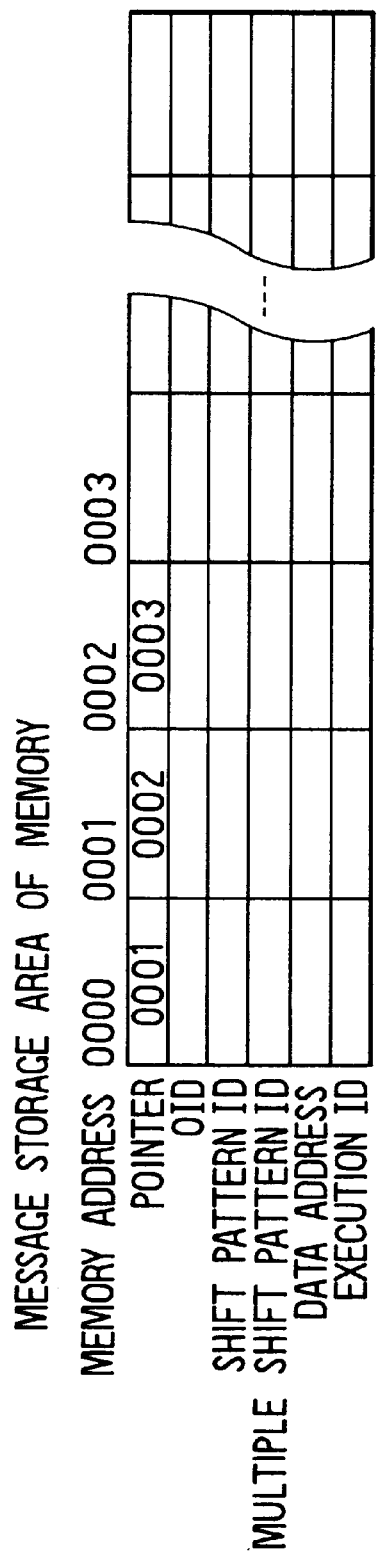

After the shift request routine (same as FIG. 6), the shift monitor start routine is executed in the same manner as in the first embodiment (FIG. 8). However, in executing step S40 (FIG. 8), the drive control request message is stored as shown in FIGS. 25A and 25B.

The memory area comprises numerous memory blocks reserved in the RAM one unit of which is a predetermined volume of area (FIG. 25A) equivalent to the size of a drive control request message data to be written. In the second embodiment, as shown in the figures, a multiple shift pattern ID section for storing the multiple shift pattern ID is provided additionally.

Figure 26:
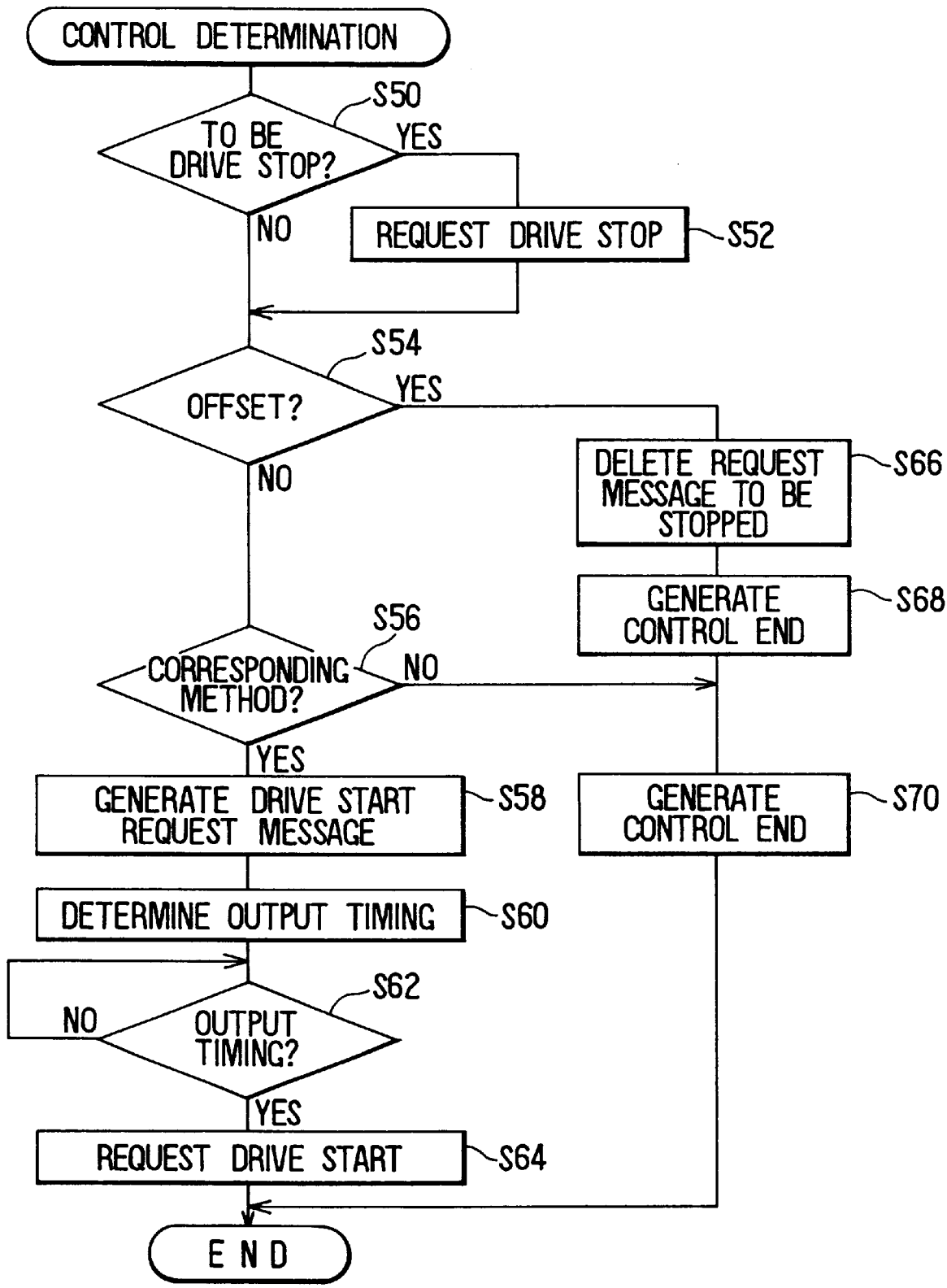
FIG. 26 is a flow chart showing a control determination routine executed according to a domain control unit object in the second embodiment.

Following the shift monitor start routine (FIG. 8), each domain control unit starts a control determination routine as shown in FIG. 26 upon receiving the drive control request message from the shift control unit SQM as described in the first embodiment (③ in FIG. 5).

The control determination routine is a routine for determining how to perform the drive control of the solenoid valve corresponding to the domain control unit based on the drive control request message that has been received this time (that is, the drive control request message causes the activation of this control determination routine) from the shift control unit SQM.

When the control determination routine is activated, first at step S50, whether the drive control routine that is being executed currently is to be stopped or not is determined. This determination is decided based on the shift pattern IDs included in the drive control request message that has been received this time. In detail, various cases are possible, for example, a table in which the conclusion for determining whether the drive control routine that is being executed currently is to be stopped or not is listed for every combination of the shift pattern ID and multiple shift pattern ID previously is prepared, and the determination is obtained with reference to the table.

As a result of determination at step S50, if the drive control routine that is being executed currently is to be stopped (YES), then at step S52 a drive stop request message is supplied to the individual control parts that is executing the drive control routine. Thereby the drive control process that is being executed is brought to a stop, and then the sequence proceeds to step S54.

The process performed at step S52 is performed in the case of, for example, multiple return shift. In detail, for example, in the case that the shift determination for performing "2→1 shift" during execution of "1→2 shift" is established and at that time the shifting stage of the shift control "1→2 shift" that is being executed is low, the drive control process that is being executed is brought to a stop to complete the shift control in a short time.

The drive stop routine that is activated in the individual control parts that is the receiver of the drive stop request message and the operation performed thereafter are described hereinafter.

On the other hand, if the drive control routine that is being executed is not to be stopped (NO), then the sequence proceeds directly to step S54 not by way of step S52. At step S54, whether the output waiting drive start request message can be offset by the drive control request message that is received this time is determined.

The drive start request message is an execution request of the drive control process to the individual control parts, which has been stored in the drive start request message memory area (FIGS. 25A and 25B) before being sent out and thereafter supplied to the requested individual control parts at the O0 predetermined output timing. That is, the output waiting drive start request message is a message that is being stored in the drive start request message memory area and that is not yet sent out at the present time.

The case that the output waiting drive start request message can be offset includes, for example, a following case. In detail, that is a case in which when the shift determination for execution of "2→3 shift" is established and the shift determination for execution of "3→2 shift" is established during execution of "1→2 shift", the shift control of "2→3 shift" is offset by the "3→2 shift", and after all, the shift position returns to the original gear position (in the present example, 2nd gear position). In such case, if the drive start request message is in the state of output waiting when the shift determination "3→2 shift" is established, this message can be offset. In some cases, a solenoid valve can not return to the original state even though it is the case of such multiple return shift, therefore the drive start request message is not always offset.

The possibility whether the output waiting drive start request message can be offset by the drive control request message supplied to the domain control unit or not has been determined in the predetermined table. The determination at step S54 is performed with reference to the table in detail based on the shift pattern IDs included in both messages.

As a result of the determination at step S54, if the output waiting drive start request message cannot be offset (NO), then the sequence proceeds to step S56. On the other hand, if the output waiting drive start request message can be offset (YES), then the drive start request message that can be offset (that is, the message that is not to be sent out) is deleted at step S66, and the control end response message is sent out at step S68. The control end response message is equivalent to "control end response message" and includes the execution ID of the deleted drive start request message. The shift control unit SQM activates the control end response routine (FIG. 20) in response to the control end response message.

At step S56, the predetermined method information table in the memory unit 57 is referred to based on the shift pattern IDs included in the drive control request message to thereby retrieve the drive control process (method of individual control parts) corresponding to these IDs. As a result of retrieval, if there is no target method (S56: NO), then at step S70 a response message for informing that there is no target method (generated as the message equivalent to the control end response message) is sent out, and the control determination routine is brought to an end.

The response message (control end response message) generated at step S70 is equivalent to "response message for informing that there is no drive control process to be executed". The response message includes the execution ID that is informed by means of the drive control request message received this time. As a result of the process at step S70, the shift control unit SQM activates the control end response routine (FIG. 20).

On the other hand, if there is the corresponding method (S56: YES), the sequence proceeds to step S58, the content of the drive start request message to be transmitted to the individual control parts is stored in the predetermined memory area. That is, the OID of the individual control parts having the method to be executed is determined based on the shift pattern ID at step S58. The OID is stored in the drive start request message storage memory area as the control start request message content together with the shift pattern ID included in the drive control request message transmitted from the domain control unit, the multiple shift pattern ID, and the storage address and execution ID of the control data to be used.

The drive start request message memory area is the message storage memory area reserved in the RAM of the memory unit 57.

The memory area is reserved in the RAM of the memory unit 57 separately from the memory area for storing the above drive control request message, and this memory area has the same structure as the memory area shown in FIGS. 25A and 25B for the drive control request message. The drive start request message memory area functions as "drive start request message memory means".

Next, step 60 subsequent to step S58 is executed to determine the output timing for transmitting the control start request message to the individual control parts corresponding to the shift pattern IDs. When the output timing is to be determined, the memory content of the drive start request message memory area corresponding to a plurality of domain control units including this domain control unit is referred to, and the content of the drive control process that is being performed or expected to be performed is taken into consideration. Thereby, the drive control process is performed synchronously or correlatively by a plurality of drive parts, and the timely drive control is realized.

After the output timing is determined at step S60, and the sequence remains in waiting until the output timing comes at step S98 (S62: NO). When the output timing comes (S62: YES), the control request message is transmitted (the method of the individual control parts is activated based on the shift pattern IDs) to the individual control parts based on the shift pattern IDs at step S64 (④ in FIG. 5), and then the control determination routine is brought to an end.

The method of the individual control parts is activated based on the shift pattern IDs at step S64 as described hereunder. That is, the memory unit is provided previously with the method information table that stores the shift pattern IDs correlated to the storage position in the memory unit 57 where the method corresponding to the shift pattern IDs is stored. The address of the method is determined with reference to the method information table based on the shift pattern ID, and the method is activated. The method information table is different for each domain control unit.

When the drive start request message is supplied to the individual control parts at step S64, the individual control parts that has received the drive start request message starts the corresponding drive control process.

When step S64 of the control determination routine described above is executed in the accumulator back pressure control unit OBsln, the process according to the method for driving the linear solenoid valve SLN for regulating the accumulator back pressure is activated. In detail, the drive control process (accumulator back pressure control routine) according to any one of the methods of a plurality of individual control parts such as single up-shift control unit OBsln1, multiple up-shift control unit OBsln2, and 2–1 down-shift control unit OBsln3 is performed as in the first embodiment (FIG. 11).

Similarly, when step 64 of the control determination routine is executed in the B3 hydraulic control unit OBslu, the routine according to the method for driving the linear solenoid valve SLU for regulating the engaging pressure of the third brake B3 is activated. That is, the drive control process according to any one of the methods of a plurality of individual control parts such as single up-shift control unit OBslu1 and 2–1 down-shift control unit OBslu2 is executed as in the first embodiment (FIG. 13).

When step S64 of the control determination routine described above is executed in the line pressure control unit OBslt, the process for driving the linear solenoid valve SLT for regulating the line pressure is activated. In detail, the drive control process according to any one of the methods of a plurality of individual control parts such as single up-shift control unit OBslt1 and multiple up-shift control unit OBslt2 is performed as in the first embodiment (FIG. 13).

After all, in the case of non-normal shift but normal shift, there is no shift control that is being performed currently or expected to be performed at the present time point when the shift determination is established, the "NO" decision is made at step S50, "NO" decision is made at step S54, and "YES" decision is made at step S56.

After the above processes, the shift monitor routine, control end request routine, drive stop routine, drive stop response routine and control end response routine are executed as in the first embodiment (FIGS. 16–20).

In the second embodiment, the drive control process is brought to an end with the monitoring of the shift control in the shift monitor routine described above as a rule. However, in the case that multiple shift occurs, the domain control unit can bring the drive control process to an end not by means of shift monitoring to realize the most proper shift control. With inclusion of such case, one mode of an operation process realized when the multiple shift occurs (the shift request output unit SOUT generates a new shift request message before the drive control process is ended) is described hereunder.

In detail, also in the multiple shift, the shift control unit SQM executes the above shift monitor routine, and distributes drive control request messages to respective domain control units. Each domain control unit determines how to execute the shift control in view of the drive control process that is being performed currently or expected to be performed corresponding to the above control determination routine (this drive control process is recognized with reference to the drive start request message stored in the memory area) and the shift pattern IDs included in the drive control request message that has been received this time. The operation modes are different depending on respective domain control units, for example, modes <1> to <5> are exemplified.

<1> A drive control process is being performed currently (that is, a method of an individual control parts), but the drive control process corresponding to the drive control request message that has been received this time is activated in parallel.

<2> A drive control process being performed currently is stopped, and the drive control process corresponding to the drive control request message that has been received this time is activated.

<3> A drive control process that is being performed currently is continued as scheduled until an end, and then the drive control process corresponding to the drive control request message that has been received this time is activated.

<4> A drive control process that is being performed currently is stopped, and the drive control process corresponding to the drive control request message that has been received this time is not activated.

<5> A drive control process that is being performed currently is continued, and the drive control process corresponding to the drive control request message that has been received this time is not activated.

At first, in the case of <1>, "NO" decision is made at step S50 in the control determination routine (FIG. 26), "NO" decision is made at step S54, and "YES" decision is made at step S56, the objects communicate messages with each other as shown in, for example, FIG. 5.

Figure 27A:
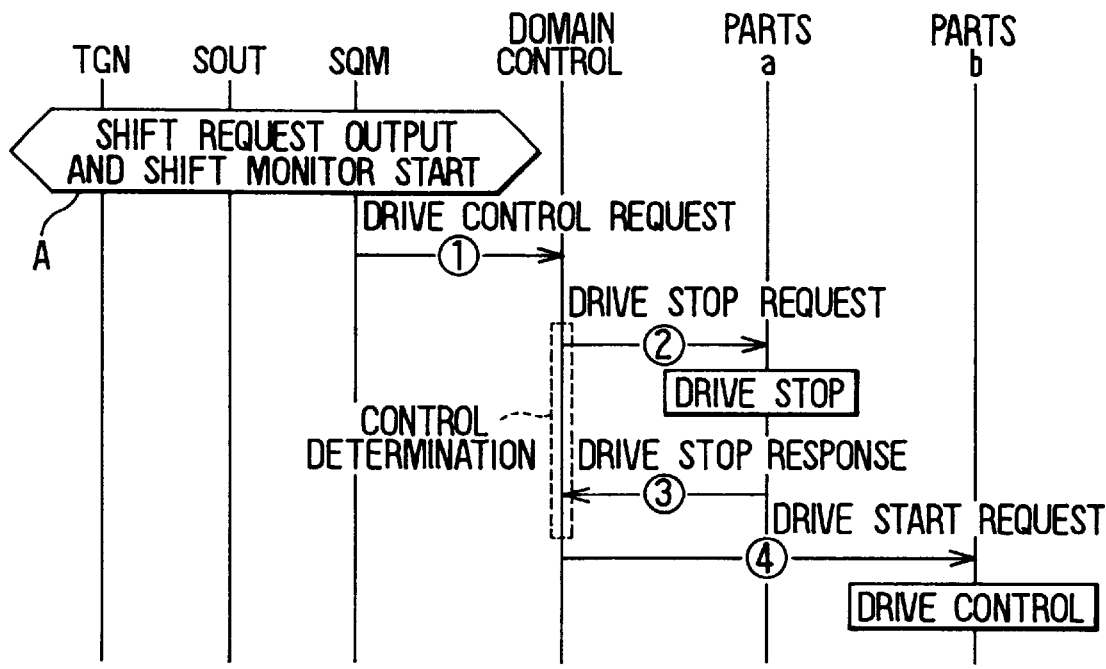
FIGS. 27A and 27B are message sequence charts showing an operation mode in the case of multiple shifts in the second embodiment.

In the case of <2>, "YES" decision is made at step S50 in the control determination routine, "NO" decision is made at step S54, and "YES" decision is made at step S56, the objects communicate messages with each other as shown in the message sequence chart of FIG. 27A. The portion A in FIG. 27A indicates that the same message communication and process as shown in the portion A enclosed with a broken line in FIG. 5 is performed. The same is true in FIG. 27B, and FIGS. 28A and 28B.

In detail, as shown in FIG. 27A, upon receiving the drive control request message from the shift control unit SQM, the domain control unit starts the control determination routine. At step S52, when the domain control unit supplies the drive stop request message (②) to the individual control parts a that is controlled to stop the process, the individual control parts a that has received the drive stop request message executes the drive stop routine, generates and returns the driving step response message (③) to the domain control unit.

Upon receiving the drive stop response message (③), the domain control unit determines "YES" in S62, and supplies the drive start request message (④) to the individual control parts b (not always different from the individual parts a) to thereby activate the drive control process corresponding to the drive control request message (①) that has been received this time. When the drive stop response message (③) is returned, the same message communication and process as shown in the portion C enclosed with a chain line in FIG. 16 are performed, but are omitted in FIG. 27A. The same is true in FIG. 27B and FIG. 28A.

Figure 27B:
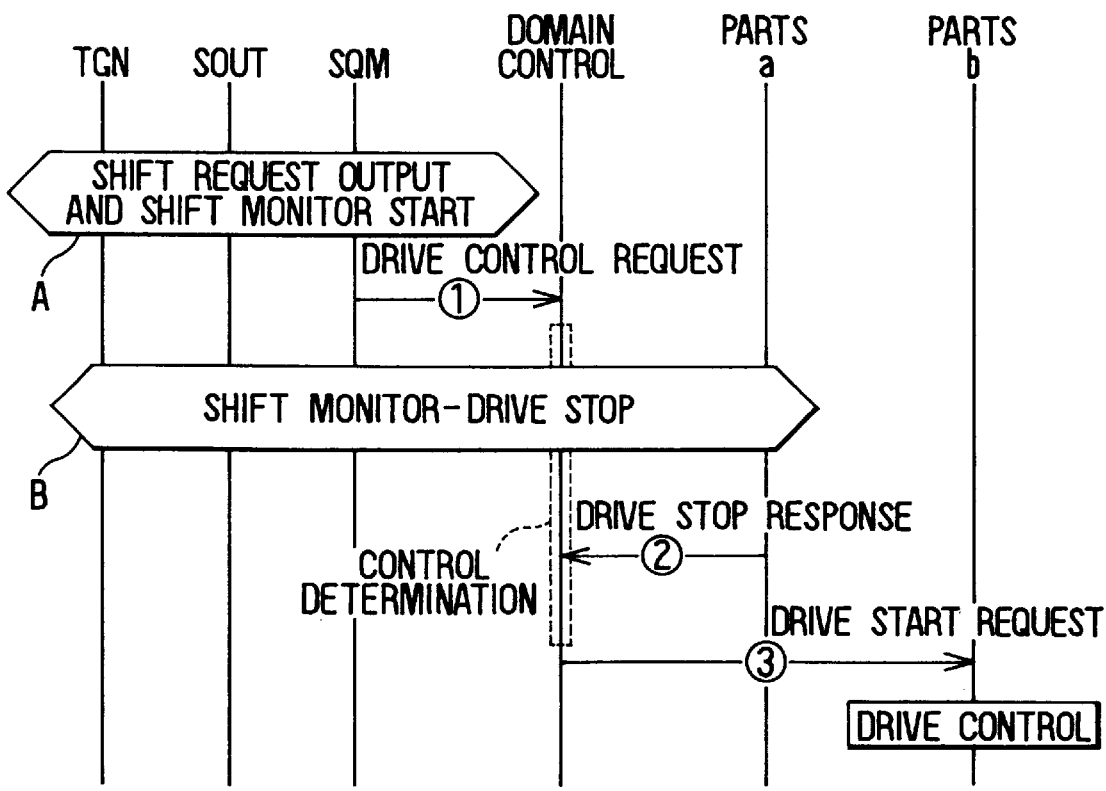

Next in the case of <3>, in the control determination routine, "NO" decision is made at step S50, "NO" decision is made at step S54, and "YES" decision is made at step S56, and the objects communicate messages with each other as shown in FIG. 27B. In this case, only the difference from <1> is the output timing determined at step S60. In FIG. 27B, the portion B indicates that the same message communication and process as shown in the portion B enclosed with a broken line in FIG. 16 are performed.

In detail, as shown in FIG. 27B, upon receiving the drive control request message (①), the domain control unit starts the control determination routine (FIG. 26), and waits for the output timing (S62: NO). Upon receiving the drive stop response message for indicating that the drive control process that is being performed currently or expected to be performed has been ended as scheduled, the domain control unit determines it to be "YES" at step S62, and supplies the drive start request message (③) to the individual control parts b (not always different from the individual control parts a) to thereby activate the drive control process corresponding to the drive control request message (①) that has been received this time.

Figure 28A:
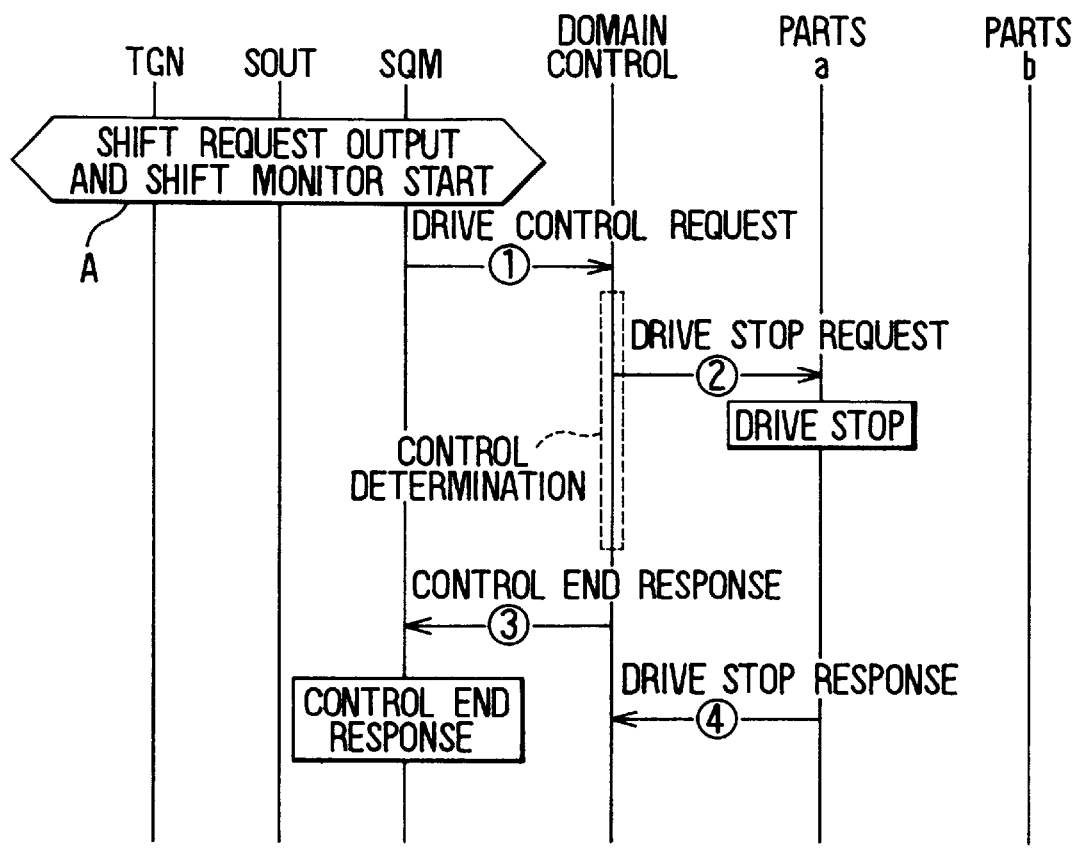
FIGS. 28A and 28B are message sequence charts showing an operation mode in the case of multiple shifts in the second embodiment.

In the case of <4>, in the control determination routine, a case in which "YES" decision is made at step S50 and then "YES" decision is made at step S54, and a case in which "YES" decision is made at step S50 and then "NO" decision is made at step S54 and further "NO" decision is made at step S56 are likely to occur, the objects communicate messages with each other as shown in FIG. 28A.

In detail, as shown in FIG. 28A, upon receiving the drive control request message (①) from the shift control unit SQM, the domain control unit starts the control determination routine. At step S52, the domain control unit supplies the drive stop request message (②) to the individual control parts a that is expected to stop the process, the individual control parts a that has received the drive stop request message executes the drive stop routine and then supplies and returns the drive stop response message (④) to the domain control unit.

The domain control unit generates the drive stop request message (②) and also generates the response message (③) for informing that there is no drive control to be performed corresponding to the drive control request message (①) that has been received this time (S70). In particular, in the case that the "YES" decision is made at step S54, the drive end response message (③) for informing that the drive start request message has been deleted at step S66 is generated (S68). As a result, the shift control unit SQM executes the control end response routine.

Figure 28B:
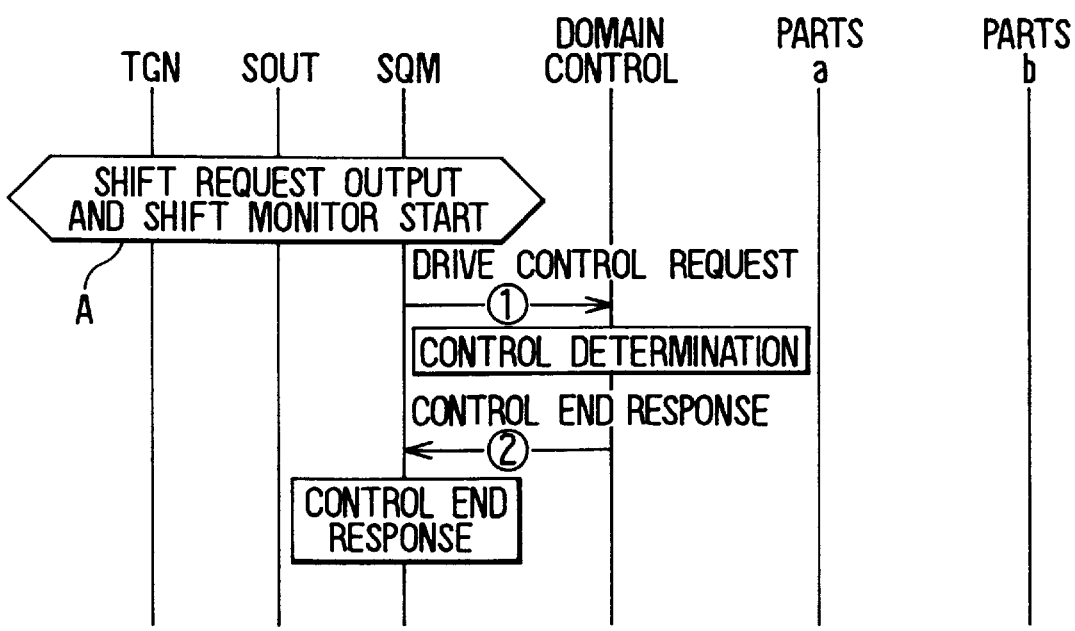

In the case of <5>, in the control determination routine, a case in which "NO" decision is made at step S50 and "YES" decision is made at step S54, and a case in which "NO" decision is made at step S50 and then "NO" decision is made at step S54, and further "YES decision is made at step S56 are likely to occur, the objects communicate messages with each other as shown in FIG. 28B.

In detail, as shown in FIG. 28B, upon receiving the drive control request message (①) from the shift control unit SQM, the domain control unit starts the control determination routine. The domain control unit generates the response message (②) for informing that there is no drive control process to be performed corresponding to the drive control request message (①) that has been received this time (S70). In particular, in the case that "YES" decision is made at step S54, the control end response message (②) for informing that the drive start request message has been deleted at step S66 (S68). As a result, the shift control unit SQM executes the control end response routine.

Also in the case of not the multiple shift but the normal shift, if there is no "drive control process to be performed corresponding to the received drive control request message", then the message communication and process are performed as shown in FIG. 28B.

According to the second embodiment as described above, the following effects are provided in addition to the effects provided in the first embodiment.

The shift request output unit SOUT that serves commonly for a plurality of drive parts executes the shift determination and detection of the shift stage of the shift control that is being performed currently in the case of multiple shift, and transmits the shift pattern IDs that indicates the results to domain control units by means of the drive control request message, and thereby allows the domain control units to determine the content of the drive control process. As a result, a plurality of drive parts that are necessary for shift control can be driven at proper timing even in the case of multiple shift while the advantage that the drive parts are operated according to the object-oriented program (that is, improved independence and re-usability of the program) is maintained.

In the case of multiple shift, in some cases, the proper operation corresponding to the shifting stage of the shift control that is being performed currently (that is, transition from the shift control in the first stage to the shift control in the second stage) is different depending on the respective drive parts. Because each domain control unit is allowed to determine and performs the content of the drive control process separately, it is possible to realize the complex operation easily.

The shift pattern ID and multiple shift pattern ID obtained by the shift request output unit SOUT are transmitted not only to a domain control unit that is necessary for realizing the shift control (a necessary domain control unit is not selected) but transmitted to all the domain control units by means of the drive control request message supplied from the shift control unit SQM. Each domain control unit is allowed to determine the content of the drive control process to be performed (including the case in which the process is not performed substantially, that is, the case in which there is no process content) based on the drive control request message. As a result, even in the case that the combination of drive parts that are necessary for shift control is changed, the modification of the shift request output unit SOUT and the shift control unit SQM is almost not required, but the change is attainable only by modification of the object corresponding to the drive parts that relates to the change.

(Third Embodiment)

A third embodiment is constructed similarly as the first embodiment (FIGS. 1 to 3). However, in this embodiment, the shift control is differentiated between a normal shift condition and a special shift condition. The shift control under the special shift condition is effected in response to outputs from the manual shift lever 53 and the cruise control ECU 70 (FIG. 1). Therefore, the control program is defined as shown in FIG. 29 based on the object-oriented programming.

Figure 29:
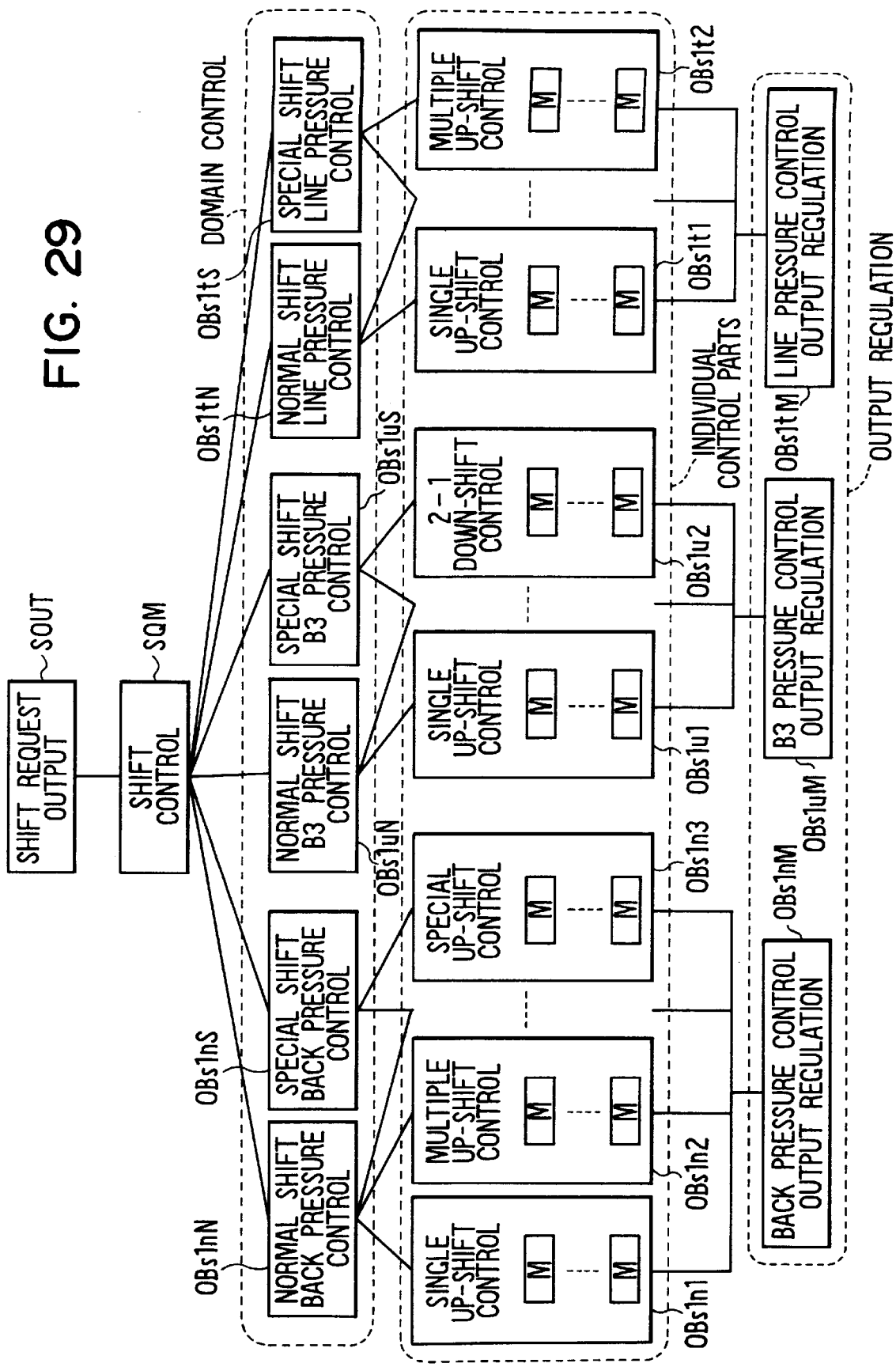
FIG. 29 is an explanatory diagram showing a correlation between a plurality of objects according to a third embodiment of the present invention.

In FIG. 29, the shift request output unit SOUT performs shift determination based on the vehicle control states. In detail the shift request output unit SOUT performs shift determination based on the vehicle control states that is, the combination of the throttle opening and the vehicle speed (that is, the normal shift condition), and in addition performs shift determination based on, other than the normal shift condition, the operation of the shift lever 53 by a driver (gear range change operation) or the condition defined by control states in the cruise (constant speed) control process (that is, the special shift condition). When the shift determination is established, the shift type is determined, and what shift condition is used for establishing the shift determination is determined.

On the other hand, the shift control unit SQM generates the shift type information for indicating the shift type (shift pattern ID) and the information for indicating shift condition (normal shift condition or special shift condition), that is the cause of establishment of the shift determination (special shift pattern ID), included in the drive control request message. That is, the shift request output unit SOUT is equivalent to "shift determination object", and the shift control unit SQM is equivalent to "shift control object". The CPU 56 operates according to the shift request output unit SOUT and the shift control unit SQM to thereby realize the function of shift control.

"Domain control unit", "individual control parts", and "output regulation unit" that are provided for each drive parts (that is, linear solenoid valves SLN, SLU and SLT) of the automatic transmission are provided as the object for defining the operation of the T-ECU 55 in addition to the shift request output unit SOUT and the shift control unit SQM. The CPU 56 performs the process according to the "domain control unit", "individual control parts" and "output regulation unit" to thereby realize drive control.

The domain control unit determines the content of the drive control process corresponding to the shift type determined as described above, and two types of domain control units that is, the normal shift control unit and the special shift control unit are prepared for every drive parts (that is, every linear solenoid valves).

The normal shift control unit is the object for managing the process operation performed on the solenoid valves SLN, SLU and SLT to realize the shift control when the shift determination is established based on the normal shift condition, and is equivalent to "normal shift management object". The CPU 56 performs the process according to the normal shift control unit to thereby realize normal shift management.

The special shift control unit is the object for managing the process operation performed on the linear solenoid valves SLN, SLU and SLT to realize the shift control when the shift determination is established based on the special shift condition, and is equivalent to special shift management object. The CPU 56 performs the process according to the special shift control unit to realize special shift management.

A normal shift accumulator back pressure control unit OBslnN, normal shift B3 hydraulic control unit OBsluN, normal shift line pressure control unit OBsltN are provided as the normal shift control units. A special shift accumulator back pressure control unit OBslnS, special shift B3 hydraulic control unit OBsluS, and special shift line pressure control unit OBslnS are provided as the special shift control units.

The individual control parts are objects that perform the drive control process for driving the linear solenoid valves SLN, SLU and SLT to thereby drive the linear solenoid valves SLN, SLU and SLT. These individual control parts are constructed so as to execute the calculation process for calculating the control value for driving the linear solenoid valves SLN, SLU and SLT, and constructed so as to execute the calculation process in parallel separately. A plurality of individual control parts are provided to every linear solenoid valves SLN, SLU and SLT, and these individual control parts are also execute the calculation process in parallel separately.

The drive control process for the linear solenoid valves SLN, SLU and SLT is categorized into the normal shift control such as single up-shift (for example, "1st gear→2nd gear", and "2nd gear→3rd gear", ... ), multiple up-shift (for example, "1st gear→2nd gear→3rd gear", 2nd→3rd gear→4th gear), and 2–1 down-shift (for example, "2nd gear→1st gear" in the case of "1st gear→2nd gear→1st gear", and "2nd gear→1st gear" in the case of "3rd gear→2nd gear→1st gear") and the special shift control. The individual drive parts are objects for calculating the control value of the linear solenoid valves SLN, SLU and SLT as the individual driving processes categorized as described above, and have methods.

An output regulation unit is the object for driving the linear solenoid valves SLN, SLU and SLT based on the control value calculated by the individual control parts. In detail, the individual control parts calculate the current supply duty ratio for driving the linear solenoid valves SLN, SLU and SLT as the control value, and the current supply duty ratio is stored in a control value buffer (FIGS. 34A to 34C) that the output regulation units have (that is, the drive parts have).

The control value buffer is the memory area defined in the RAM of the memory unit 57, the control value calculated by the individual control parts is stored temporarily. The control value buffer can store a plurality of control values, and stores the control values in the order of priority. The output regulation units use the control value that is stored in the highest priority area as an effective value to drive the corresponding linear solenoid valves SLN, SLU and SLT.

The object constructed as above will be described hereunder individually for each drive parts of the automatic transmission 2. In detail, first the normal accumulator back pressure control unit OBslnN and the special accumulator back pressure control unit OBslnS are a domain control unit provided corresponding to the above linear solenoid valve SLN, which selects and determines the drive control process for driving the linear solenoid valve SLN based on the drive control request message.

The content of the drive control process for driving the linear solenoid valve SLN is described in the methods of the individual control parts (single up-shift control unit OBsln1, multiple up-shift control unit OBsln2, and special up-shift control unit OBsln3, . . . ). The accumulator back pressure control value output regulation unit OBslnM drives the linear solenoid valve SLN based on the control value calculated by these individual control parts.

The normal B3 hydraulic control unit OBsluN and the special shift B3 hydraulic control unit OBsluS are objects provided corresponding to the above linear solenoid value SLU, which selects and determines the drive control process for driving the linear solenoid valve SLU based on the drive control request message. The content of the drive control process for driving the linear solenoid valve SLU is described in the methods of the individual control parts (single up-shift control unit OBslu1, and 2–1 down-shift control unit OBslu2, . . . ) separately for shift types. The B3 hydraulic control value output regulation unit OBsluM drives the linear solenoid valve SLU based on the control value calculated by these individual control parts.

The normal line pressure control unit OBsltN and the special shift line pressure control unit OBsltS are objects provided corresponding to the above linear solenoid value SLT, which selects and determines the drive control process for driving the linear solenoid valve SLT based on the drive control request message.

The content of the drive control process for driving the linear solenoid valve SLT is described in the methods of the individual control parts (single up-shift control unit OBslt1, and multiple up-shift control unit OBslt2, . . . ) separately for shift types. The line pressure control value output regulation unit OBsltM drives the linear solenoid valve SLT based on the control value calculated by these individual control parts.

Depending on the drive parts, it is not necessary to discriminate between the special shift control and the normal shift control on the entire control area/partial control area. Therefore, the individual control parts are not necessarily categorized definitely into the individual control parts that are controlled by the special shift control unit and the individual control parts that are controlled by the normal shift control unit.

That is, some individual control parts receive the directive (message) from both domain control units, and some individual control parts receive the directive from any one domain control unit. Because the drive parts are different depending on the mechanical characteristic of the automatic transmission and the control characteristic required for the vehicle, the drive parts are not the same for all automatic transmissions, and are various.

Next, the operation realized by means of these objects to which the CPU performs the process accordingly is described with reference to the message sequence charts and flow charts.

Figure 30:
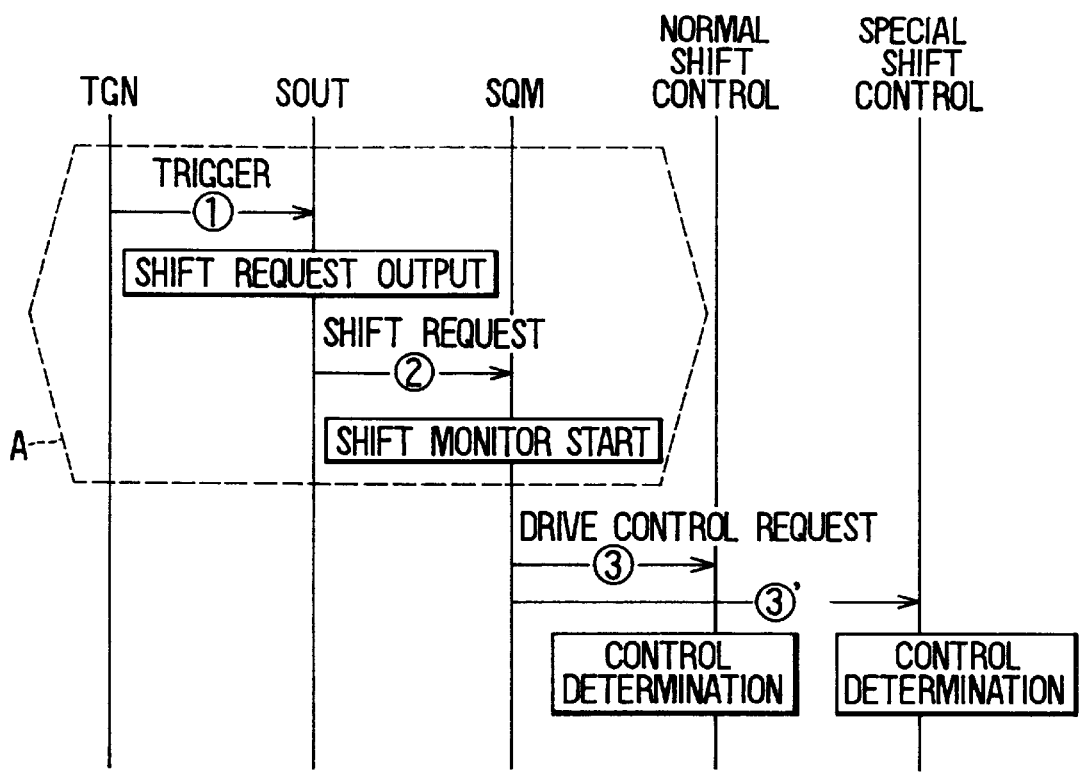
FIG. 30 is a message sequence chart showing a process from determination of the shift type to control determination of a domain control unit object in the third embodiment.

As shown in the message sequence chart shown in FIG. 30, the memory unit 57 of the T-ECU 55 generates a trigger message to the shift request output unit SOUT every predetermined time interval (16 ms) as the object other than that described above in the same manner as in the first embodiment (FIG. 5). When the trigger generator TGN generates and sends the trigger message to the shift request output unit SOUT (①  in FIG. 5), the shift request output unit SOUT executes shift request output routine shown in FIG. 31 in the similar manner as described with reference to FIG. 6.

Figure 31:
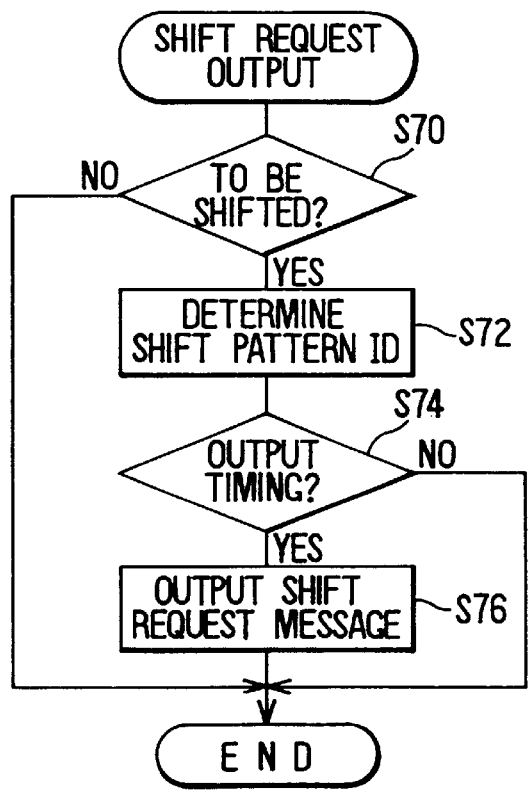
FIG. 31 is a flow chart showing a shift request output routine executed according to the object of the shift request output unit in the third embodiment.

In FIG. 31, however, the shift determination is established under various conditions at step S70. First (a) is the case in which the shift determination is established as a result obtained with reference to the position shifting diagram with aid of the throttle opening and the vehicle speed as the parameter. That is, (a) is the case in which the shift determination is established based on the normal shift condition.

In some cases of (b) in which a driver shifts the shift lever 53, (c) a driver operates the handy switch (not shown in the figures), and (d) a shift position conversion request is supplied from the constant speed running control unit (constant speed running ECU) 70, the shift position can be changed. The cases (b) to (d) in the present example other than the above case (a) are equivalent to the case in which the shift determination is established based on the special shift condition.

In the case that the shift determination is established at step S70 (YES), the sequence proceeds to step S72, and the shift pattern ID and the special shift pattern ID are determined. The shift pattern ID is an identifying code for indicating the shift type, and determined based on the process result obtained at step S70. On the other hand, the special shift pattern ID is an identifying code for indicating the shift condition that is the cause of the shift determination established at step S70, that is, an identifying code for indicating that the cause corresponds to what of the above (a) to (d), different identifying codes are given to respective cases (a) to (d). The special shift pattern ID other than (a) corresponding to (b) to (d) in the present example are equivalent to "special shift information".

Also the multiple shift pattern ID is determined at step S72. In some cases, another shift determination is established during shift control operation due to throttle opening change or other causes, that is, a new shift determination is established (that is, multiple shift) before a shift control started in the past is ended.

For such multiple shift, differently from normal shift that involves one shift determination for completion, the operation corresponding to the shifting stage of shift control that is being performed currently is applied to thereby convert the shift control from the first stage shift control that is being performed currently to the second stage shift control that is to be performed next (for example, so as to mitigate the shift shock). That is, the multiple shift pattern ID is an identifying code that collectively indicates the shifting stage of the shift control that is being performed currently and other various information to be considered for multiple shifting (for example, throttle opening and engaging state of the engaging units of the automatic transmission).

Though the shift pattern ID, the special shift pattern ID, and the necessary multiple shift pattern ID determined as described above are supplied from the shift request output unit SOUT to the shift control unit SQM at step S76, which will be described hereinafter, at step S72 the output timing is also determined.

The output timing is determined with reference to the data table that is stored previously in the memory unit 57 based on the information such as the shift pattern ID, throttle opening, state of accelerator pedal sensor 9 (power ON state or power OFF state), and state of lock-up clutch 30 (engaging state or disengaging state). The output timing is set with reference to various timings (the timing when the shift determination is established and disengaging timing of the lock-up clutch 30) depending on the above various information.

After the determination routine of the shift pattern IDs and the output timing thereof at step S72, steps S74 and S76 are executed in the same manner as in the first embodiment (FIG. 6) so that the shift request message is supplied to the shift control unit SQM. The shift request message includes the shift pattern IDs. This shift request message is processed by the shift request output unit SOUT and by the shift control unit SQM in the same manner as described with reference to the first and second embodiments (FIGS. 7 and 24).

Upon receiving the shift request message from the shift request output unit SOUT as described above (③ in FIG. 30), the shift control unit SQM executes the shift monitor start routine (FIG. 8). The shift monitor start routine is executed to generate messages (drive control request message) to be distributed to respective domain control units, and the messages are stored in the memory areas (FIGS. 32A and 32B) defined previously in the RAM of the memory unit 57.

The memory area comprises numerous memory blocks reserved in the RAM one unit of which is a predetermined volume of area (FIG. 32A) equivalent to the size of a drive control request message data to be written. As shown in FIG. 32A, the memory block is provided with a pointer for indicating the order of memory blocks (that is, the pointer in which the address of the next memory block is stored), an OID section for storing an object ID (OID) for indicating the object to which the message is to be supplied, a shift pattern ID section for storing the shift pattern ID, a special shift pattern ID section for storing the special shift pattern ID, a multiple shift pattern ID section for storing the multiple shift pattern ID, an address section for storing the address of an argument (control data) to be used in the process (that is, method) of the receiver object, and execution ID section for storing the execution ID assigned every time when the drive control request message is written on the message storage memory area by the shift pattern buffer SQMc.

Because the control start processing unit SQMb generates 6 drive control request messages for respective 6 domain control units, the content of three messages is stored in the memory area. For example, in the state that no message content is stored in the message memory area, "1" to "6" are assigned respectively to 6 messages as the execution ID, and stored together with the message content.

Upon receiving the drive control request message from the shift control unit SQM as described above (③ in FIG. 30), each domain control unit starts the control determination routine in the same manner as in the first embodiment (FIG. 10). In this control determination routine, when the output timing comes (S98: YES), the control request message is distributed (the method of the individual control parts is activated based on the shift pattern IDs) to the individual control parts based on the shift pattern IDs at step S100 (④ and ④' in FIG. 33), and then the control determination routine is brought to an end.

The method of the individual control parts is activated based on the shift pattern IDs as described hereunder. That is, the memory unit is provided previously with the method information table that stores the shift pattern IDs correlated to the storage position in the memory unit 57 where the method corresponding to the shift pattern IDs is stored. The address of the method is determined with reference to the method information table based on the shift pattern IDs, and the method is activated. The method information table is different for each domain control unit.

Figure 33:
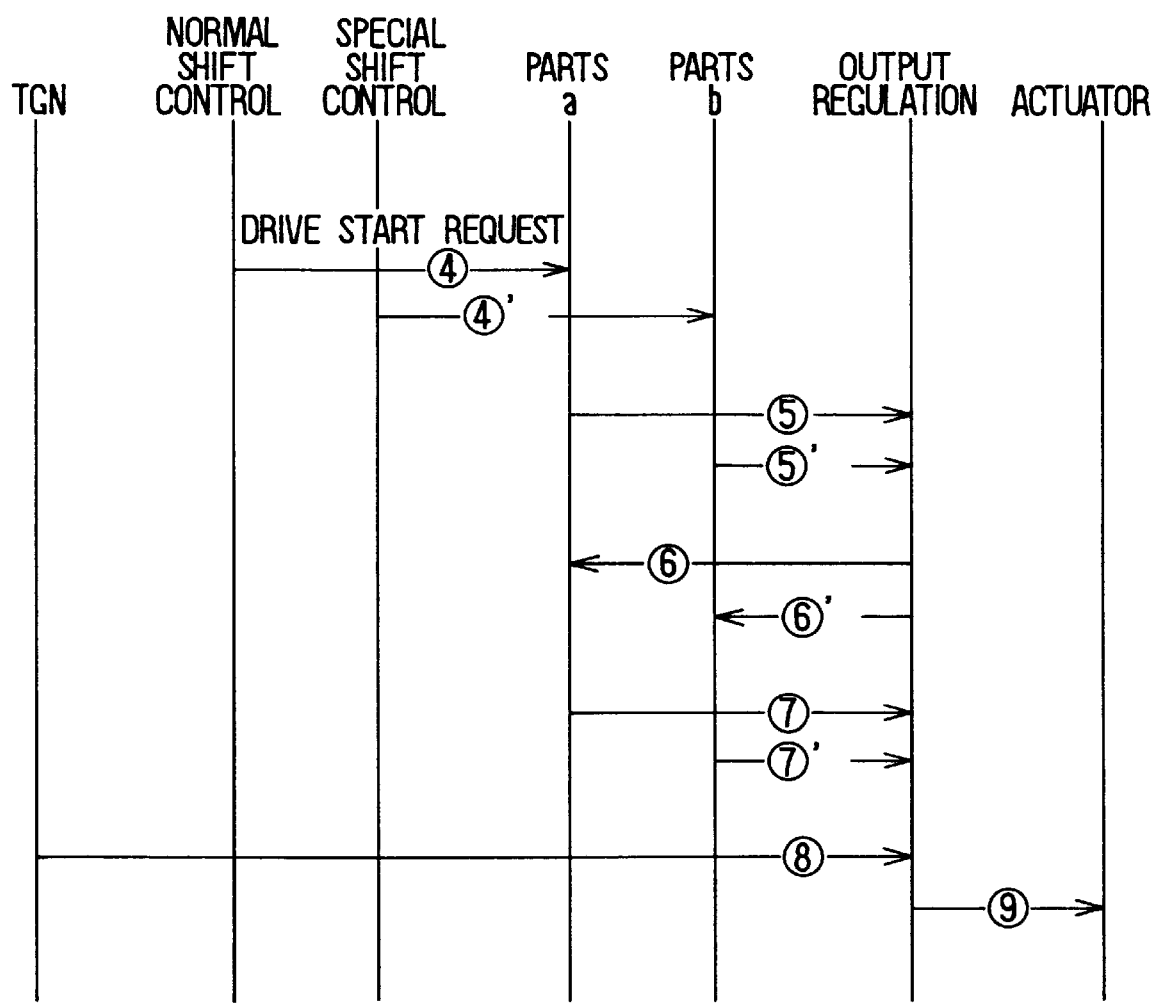
FIG. 33 is a message sequence chart showing a process from the drive start request message generated by the domain control unit object to actuator driving in the third embodiment.

When the domain control units perform the control determination process as described above and supply the drive start request messages to the individual control parts (S100), the individual control parts that have receives the drive start request message supply the priority order and OID of respective individual control parts to the output regulation unit (⑤ and ⑤' in FIG. 33).

In some cases the control start request message is distributed from both domain control units that is, the normal shift control unit and the special shift control unit to the individual control parts, but in some cases the control start request message is distributed from any one of both domain control units to the individual control parts. The result is different for each drive parts depending on the shift pattern IDs supplied from the shift request output unit SOUT. Herein, a case in which the control start request message is distributed from both domain control units to the individual control parts is exemplified for in the description.

The priority order is assigned previously to every individual control parts as shown in FIGS. 34A to 34C. As described hereinafter, the control value that is calculated by the individual control parts having the higher priority order is used preferentially during the drive control of the drive parts (that is, the linear solenoid valves SLN, LSU, and SLT). The priority order is not necessarily one-to-one corresponding to the OID, the same priority order is possible. The priority order is not specific to each individual control parts, and can be changed depending on the control states of the vehicle.

For example, in the case that the special shift control takes priority over the normal shift control, the individual control parts that receives the control start request message from the special shift control unit takes priority over the individual control parts that receives the control start request message from the normal shift control unit. On the other hand, in the case that the normal shift control takes priority over the special shift control depending on the vehicle control states, the latter takes priority over the former.

Upon receiving the priority order and OID of the individual control parts, the output regulation unit assigns 1 block corresponding to the priority order of the individual parts in the control value buffer, and returns the "registration ID", which is an identifying code specific to the block, to the individual control parts (⑥ and ⑥' in FIG. 33).

For example, as shown in FIG. 33, upon receiving "priority order"="#1" from the individual control parts a and upon receiving "priority order"="#2" from the individual control parts b, the output regulation unit assigns 1 block (for example, a block specified by "registration ID"="a") that is "priority order"="#1" in the control value buffer to the individual control parts a, and assigns 1 block (for example, a block specified by "registration ID"="d") that is "priority order"="#2" in the control value buffer to the individual control parts b. The information "registration ID"="a" is transmitted to the individual control parts a and the information "registration ID"="d" is transmitted to the individual control parts b.

Figure 35:
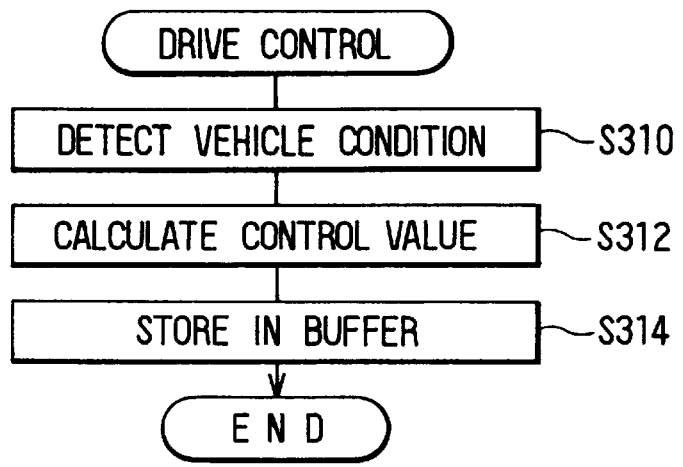
FIG. 35 is a flow chart showing the drive control process performed according to the individual control parts object in the third embodiment.

The individual control parts to which "registration ID" has been assigned as described above starts the drive control process as shown in FIG. 35. The content of the drive control process performed by the individual control parts is different for each individual control parts and for each shift pattern IDs, but the drive control process has the routine basically as shown in FIG. 35. The content of the drive control process is activated synchronously with the trigger message supplied every predetermined time interval (16 ms) from the trigger generator TGN, and is repeated until the individual control parts that is performing the drive control process receives a drive stop request message, which will be described hereinafter.

The drive control process starts, at first, for example, the vehicle control states such as input shaft rotation speed and power ON/OFF is detected (S310), and the control value (in the present example, duty ratio) used for driving the corresponding drive parts (that is, solenoid valve) is calculated corresponding to the detected result (S312). The calculated value includes not only meaningful effective value but also meaningless ineffective value. For example, in the case that a certain individual control parts is addressed, an effective value is calculated when the power is OFF state but an ineffective value is calculated when the power is ON state, not only the magnitude of the control value changes but also the control value changes between the effective value and the ineffective value depending on the case like the case described above.

Thereafter, the individual control parts supplies the control value calculated by the individual control parts itself together with "registration ID" assigned to this individual control parts in the form of set to the output regulation unit (⑦ and ⑦' in FIG. 33) to thereby register the control value in the control value buffer of the output regulation unit (S314).

The output regulation unit supplies the signal corresponding to the control value registered in the control value buffer synchronously with the trigger message (⑧ in FIG. 33) generated from the trigger generator TGN every predetermined time interval (16 ms) to the corresponding drive parts (in detail, driving circuits for driving the linear solenoid valves SLN, LSU, and SLT) (⑨ in FIG. 33) to thereby drive the drive parts.

In the case that only one control value is registered in the control value buffer, that control value is used, but in the case that a plurality of control values are registered in the control value buffer, one control value to be used is selected based on the information such as the "priority order", the validity of the control value that is, effective or ineffective", and "registration ID".

For example, as shown in FIG. 12, in the case that "registration ID"="a" block, and "registration ID"=control value effective for "d" block ("20%", "10%") are stored, the control value stored in the block having higher priority order ("priority order"="#1") is selected. Concomitantly with the vehicle control condition change that occurs later, an ineffective value (denoted by "FF") is set to "registration ID"="a" block and only the effective control value is stored in "registration ID"="d" block, in this case, this control value is used.

Otherwise, in the case that a plurality of control values are stored in the blocks having the same priority order, the control value stored in the (head) block stored first is used. For example, in the case that effective values (effective control values) are stored in both blocks "a" and "b" having the same "priority order" of "#1", "a" block in which an effective value has been registered earlier is selected.

In the case that there is no corresponding method in the control determination routine shown in FIG. 10 (S92: NO), the message for informing that result (control end response message described hereinafter) is supplied to the shift control unit SQM as described above, the message communication between objects performed at that time is shown in a message sequence chart of FIG. 36. In a hexagon indicated with A in FIG. 36, the same message communication and process as those shown in the dotted line hexagon (A) in FIG. 30 are performed.

Figure 36:
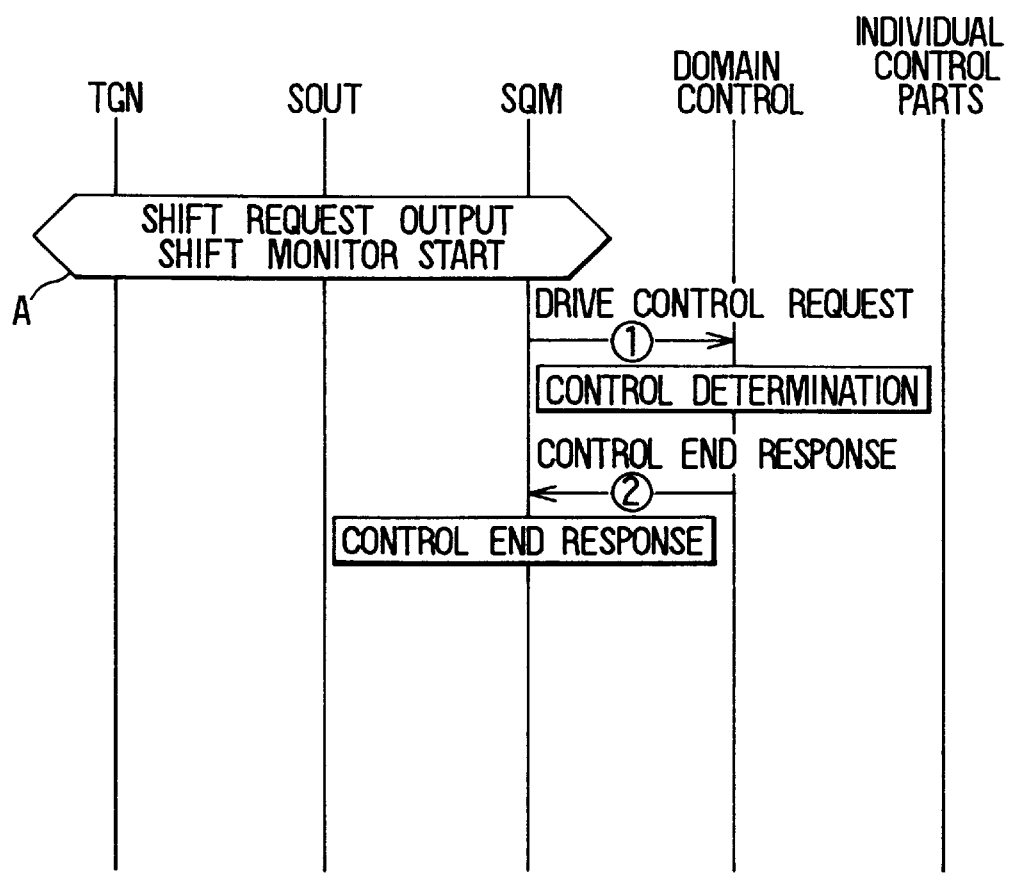
FIG. 36 is a message sequence chart showing a process in the case that there is no method to be executed corresponding to the shift type in the third embodiment.

As shown in FIG. 36, when the shift control unit SQM generates the drive control request message (① in FIG. 36), each domain control unit executes the control determination routine described above, the drive control request message includes "execution ID" and "OID" of each domain control unit. When step S93 (FIG. 10) process of the control determination routine is executed, the corresponding domain control unit generates and supplies the control end request response to the shift control unit SQM (② in FIG. 36).

Then, the third embodiment operates in the same manner as in the first embodiment (FIGS. 16 to 21).

According to the third embodiment, in addition to the effects of the first embodiment, the following effect can be provided. That is, two types of shift control units, that is, the normal shift control unit and the special shift control unit are provided to each of linear solenoid valves SLN, LSU, and SLT as the domain control unit for managing the process according to the individual control parts. As a result, when the specification of any one of the normal shift control and the special shift control is changed, the change is attainable only by modifying the corresponding domain control unit, and thus the independence of the program is more improved.

The present invention should not be limited to the above described embodiments, but may be implemented in many other ways without departing from the spirit of the invention. For instance, the present invention may be applied to other drive parts other than the linear solenoid valves.

What is claimed is:

1. An electronic control system for an automatic transmission mounted on a vehicle comprising:

a plurality of drive control means provided for a plurality of respective drive parts of the automatic transmission, the control means being for determining drive control process contents for the drive parts, respectively, in response to a predetermined drive control request message, and for executing the determined control process contents; and shift control means for determining whether a shift control for changing a gear ratio is to be effected, for determining a shift type to be effected when the shift control is determined to be effected, and for transmitting the drive control request message to at least one of the drive control means, the drive control request message including shift type information indicating the determined shift type, wherein the drive control means and the shift control means are defined in a control program as objects for performing predetermined control functions, respectively.

2. An electronic control system as in claim 1, wherein:

the drive parts are operable separately from each other; and the shift control means includes shift type determination means for determining the shift type, and transmits the drive control request message to all of the drive control means so that each drive control means determines the drive control process contents thereof in response to the received drive control request message.

3. An electronic control system as in claim 2, wherein:

each of the drive control means is constructed so as to perform the control process content according to a method formed by dividing the control program in which the content of the drive control process is defined into divided programs for each shift type, and provided with method information memory means that stores the information that is usable to specify the method based on the shift type information, specifies the method corresponding to the shift type information included in the drive control request message based on stored memory content when the drive control request message is received to thereby determine the drive control process content to be executed.

4. An electronic control system as in claim 2, wherein:
the drive control means determines whether there is a drive control process to be performed corresponding to the shift type information included in the drive control request message when the drive control request message is received, and transmits to the shift control means a response message indicating that there is no drive control process to be performed corresponding to the drive control request message if there is no drive control process to be performed is obtained; and
the shift control means is constructed so as to store the content of all drive control request messages transmitted to the drive control means in predetermined message memory means as the information used to monitor a process operation in the drive control means, and to delete the content of the drive control request message corresponding to the response message is deleted from the message memory means when the response message from any one of the drive control means after output of the drive control request message is received.

5. An electronic control system as in claim 4, wherein:
the drive control means transmits an end message for informing the drive control process has been ended to the shift control means when the drive control process is ended; and
the shift control means deletes the content of the drive control request message that has been supplied to the drive control means as the execution request of the drive control process from the message memory means when the end message indicating that the drive control process has been ended is received from any one of the drive control means.

6. An electronic control system as in claim 2, wherein:
the drive control means performs the process according to a control determining object for determining the content of a drive control process to be performed in the drive control means and according to a drive control object for performing the drive control process.

7. An electronic control system as in claim 6, wherein:
the object includes a plurality of objects divided corresponding to the control content.

8. An electronic control system as in claim 1, wherein:
the shift control means detects a shifting stage of the shift control in execution currently and generates shifting stage information indicating the degree of progress of shifting to thereby control the drive control means to perform the drive control process corresponding to the shift type and the shifting stage.

9. An electronic control system as in claim 8, wherein:
the shift control means generates the drive control request message including the shifting stage information in addition to the shift type information.

10. An electronic control system as in claim 9, wherein:
the shift control means supplies the drive control request messages to all the drive control means to thereby allow the drive control means to determine separately the drive control process contents.

11. An electronic control system as in claim 10, wherein:
each drive control means is constructed so that the drive control means determines whether there is a drive control process to be performed corresponding to the drive control request message or not upon receiving the drive control request message, if the negative decision result is obtained, then the drive control means supplies a response message for informing the negative decision result to the shift control means;
the shift control means is constructed so as to store the content of all the drive control request messages that have been supplied in a predetermined drive control request message memory means as the information for monitoring the process operation in the drive control means, and so as to delete the content of drive control request message corresponding to the response message from the drive control request message memory means upon receiving the response message from the drive control means after supplying the drive control request message.

12. An electronic control system as in claim 11, wherein:
each drive control means supplies a control end response message for informing that the drive control process has been ended to the shift control means upon ending the drive control process; and
the shift control means deletes the content of the drive control request message supplied to the drive control means as the execution request of the drive control process upon receiving the end message for informing that the drive control process has been ended from any one of the drive control means.

13. An electronic control system as in claim 9, wherein:
each drive control means includes a plurality of drive means for performing the process according to a plurality of drive objects formed by dividing the program that describes the drive control process content to be performed by the drive control means corresponding to the content, and managing means for performing the process according to a management object for managing the process operation of the drive means; and
the managing means determines the content of the drive control process to be performed by the drive control means based on the drive control request message when the drive control means receives the drive control request message, and supplies a drive start request message served as a drive control process request to a drive means corresponding to the determined content selectively from among the drive means to thereby control the receiver drive means to perform the determined drive control process content.

14. An electronic control system as in claim 13, wherein:
each drive means is constructed so as to supply a drive stop response message for informing that the drive control process has been ended to the managing means when ending the drive control process; and
the managing means is constructed so as to store the content of the drive start request message in the predetermined drive start request message memory means as the information for monitoring the process operation in the drive means, and so as to delete the content of the drive start request message corresponding to the drive stop response message from the drive start request message memory means upon receiving the drive stop response message from the drive means after the drive start request message is sent out.

15. An electronic control system as in claim 1, wherein:
the shift control means further determines whether the shift control is to be performed based on a normal shift condition defined by a combination of a vehicle speed and an engine load on a special shift condition defined by vehicle control states other than the combination, and supplies the drive control means a special shift condition information as well as the shift type information if the special shift condition is determined; and the drive control means performs the content of the drive control process corresponding to the shift type information and the special shift information.

16. An electronic control system as in claim 15, wherein:

the shift control means forms the shift request message to include both the shift type information and the special shift information therein.

17. An electronic control system as in claim 16, wherein:

the shift control means supplies the shift request message in parallel to all the drive control means, and the drive control means are allowed to determine the content of the drive control process individually in response to the shift request message.

18. An electronic control system as in claim 1, wherein:

each drive control means includes a plurality of domain control means storing method information which defines control process contents of each drive parts so that the method information to be performed is specified in response to the shift request message.

19. An electronic control system as in claim 1, wherein:

each drive control means includes a control determination object which defines the drive control process content and a drive control object which defines a process for performing the process content.

20. An electronic control system as in claim 1, wherein:

the drive parts includes solenoid valves which regulates pressures used in the automatic transmission.

21. An electronic control system for an automatic transmission comprising:

a plurality of unit processing means for performing respective processes to realize functions according to objects formed by dividing a control program corresponding to respective predetermined functions, wherein each unit processing means includes;

a plurality of drive control means provided for a plurality of drive parts of the automatic transmission, and operating for determining the contents of drive control processes to which the drive parts are subjected based on input information and for performing the drive control processes, and shift control means for performing the operation in which the shift control means determines whether a shift control for changing a shift position of the automatic transmission is performed or not based on a normal shift condition defined by a combination of a vehicle speed and an engine load and a special shift condition defined by a vehicle control states other than the combination, and supplying a drive control request message including a shift type information indicating a type of the shift control to be performed to the drive control means as the input information if the shift determination that the shift control is to be performed is established, wherein the shift control means supplies a special shift information indicating the special shift condition to a drive control means as the input information when the shift determination is established based on the special shift condition to thereby control the drive control means to perform the content of the drive control process corresponding to the shift type information and the special shift information.

22. An electronic control system as in claim 21, wherein:

the shift control means supplies the drive control request message including the special shift information in addition to the shift type information.

23. An electronic control system as in claim 22, wherein:

the shift control means supplies the drive control request message to all the drive control means in parallel to thereby allow each drive control means to determine the content of the drive control process individually.

24. An electronic control system as in claim 21, wherein:

each drive control means includes;

a plurality of drive means for performing the process according to the drive objects formed by dividing a program that defines the drive control processes to be performed by the drive control means corresponding to the process contents, normal shift managing means for performing the process according to a normal shift management object for managing the process operation of the drive means to realize the shift control performed when the shift determination is established based on the normal shift condition, and special shift managing means for performing the process according to the special shift management object for managing the process operation of the drive means to realize the shift control performed when the shift determination is established based on the special shift condition, wherein the normal shift managing means and the special shift managing means determine the content of the drive control process to be performed on the drive parts corresponding to the drive control means when the drive control means receives the input information based on the input information and supply the process request to the drive means selectively from among the drive means to thereby control the drive means to perform the determined content of the drive control process.

25. An electronic control system for an automatic transmission mounted on a vehicle comprising:

a memory unit that stores objects formed by dividing a control program for the automatic transmission corresponding to respective predetermined functions; and a CPU for controlling the automatic transmission by performing the control process for receiving signals corresponding to control states of the vehicle and for generating control signals based on the received signals according to the objects stored in the memory unit, wherein the memory unit stores as the objects, a plurality of drive control object provided corresponding to a plurality of respective drive parts of the automatic transmission in which the sequence for determining the content of the drive control process for the drive parts is subjected corresponding to the predetermined drive control request message and for performing the determined content of the process is described, a shift determining object in which the sequence for determining whether the shift control for converting the shift position of the automatic transmission is performed based on the normal shift condition defined by combinations of a vehicle speed and an engine load and a special shift condition defined by vehicle control states other than the combination is defined, and a shift control object provided with the sequence including the operation in which, as a result of the process performed according to the shift determining object, then the process according to the drive control object is activated by means of the drive control request message that includes the shift type information for indicating the type of shift control to be performed if the shift determination that the shift control is to be performed is established, and then the process according to the drive control object is activated by means of the drive control request message including the special shift information for indicating the special shift condition in addition to the shift type information if the shift determination is established based on the special shift condition.

26. An electronic control system as in claim 25, wherein: the shift control object is defined so as to activate the processes according to all the drive control objects in parallel.

27. An electronic control system as in claim 25, wherein: each drive control object includes;
   a plurality of drive objects formed by dividing the drive control process to be realized by the corresponding drive control object corresponding to respective divided process contents,
   a normal shift control object, which is a program for managing the process operation performed according to the driving object to realize the shift control when the shift determination is established based on the normal shift condition, provided with a described sequence for determining the content of the drive control process that is to be applied to the drive parts corresponding to the drive control object based on the drive control request message and for activating the process performed according to the driving object corresponding to the determined content selectively from among the drive objects, and
   a special shift control object, which is a program for managing the process operation performed according to the driving object to realize the shift control when the shift determination is established based on the special shift condition, provided with a described sequence for determining the content of the drive control process that is to be applied to the drive parts corresponding to the drive control object based on the drive control request message and for activating the process performed according to the driving object corresponding to the determined content selectively from among the drive objects.

28. An electronic control system for an automatic transmission used for shift control of the automatic transmission comprising:
   a plurality of unit processing means for performing processes to realize respective functions according to an object formed by dividing a control program of the automatic transmission into predetermined functions;
   wherein each unit processing means including shift type managing means for determining the type of shift control for changing a transmission gear ratio of the automatic transmission, and a plurality of drive control means, provided respectively for a plurality of component driving parts of the automatic transmission which are driven in parallel, for determining a content of the drive control process for each of the driving parts corresponding to the shift type and performing the determined drive control process content,
   wherein the shift managing means produces in parallel a drive control request message including the shift type information indicating the determined shift type as an execution request of the drive control process to all the drive control means in parallel when the shift type managing means determines the shift type, and
   wherein each drive control means determines the drive control process content and performs the drive control process control upon receipt of the drive control request message.

29. An electronic control system as in claim 28, wherein:
   each processing means includes message storage means constructed to store contents of all drive control request message produced to each driving control means as information for monitoring process operation of each drive control means, and
   each drive control means produces an end message indicative of an ending of the drive control process when the drive control process has been ended and causes the message storage means to erase the drive control request message content produced as the execution request of the drive control process.

30. An electronic control system for an automatic transmission used for shift control of the automatic transmission comprising:
   a plurality of unit processing means for performing processes to realize respective functions according to an object formed by dividing a control program of the automatic transmission into predetermined functions;
   shift type determining means for determining the type of shift control for changing a transmission gear ratio of the automatic transmission;
   a plurality of drive control means, provided as the unit processing means respectively for a plurality of component driving parts of the automatic transmission which are driven in parallel, for determining a content of the drive control process for each of the driving parts corresponding to the shift type and performing the determined drive control process content;
   a plurality of method information storage means, provided for the drive control means respectively, for storing information by which one of the methods can be specified from the shift type information; and
   shift control means for producing in parallel a drive control request message including the shift type information indicating the determined shift type as an execution request of the drive control process to all the drive control means in parallel when the shift type determining means determines the shift type, so that each drive control means which receives the drive control request message determines the drive control process content to perform the drive control process content,
   wherein each drive control means determines, from the storage content of the method information storage means, the method which corresponds to the shift type information included in the drive control request message, upon receipt of the drive control request message.

* * * * *